United States Patent
Yamazaki

(10) Patent No.: US 6,384,935 B1
(45) Date of Patent: May 7, 2002

(54) IMAGE PROCESS APPARATUS, IMAGE PROCESS METHOD AND STORAGE MEDIUM

(75) Inventor: Hiroyuki Yamazaki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,970

(22) Filed: Feb. 27, 1998

(30) Foreign Application Priority Data

Feb. 28, 1997 (JP) .............................................. 9-045667
Apr. 24, 1997 (JP) .............................................. 9-107346

(51) Int. Cl.[7] .......................... H04N 1/40; H04N 1/405; H04N 1/48; H04N 1/52; G06K 15/02
(52) U.S. Cl. ........................ 358/1.9; 358/530; 358/534; 358/443; 358/456
(58) Field of Search ........................ 358/1.9, 530, 534, 358/443, 456; 382/237; 399/366; 380/246, 243; 283/901, 902

(56) References Cited

U.S. PATENT DOCUMENTS

| | | | |
|---|---|---|---|
| 5,257,119 A | 10/1993 | Funada et al. | 358/438 |
| 5,457,540 A | 10/1995 | Kajita | 358/296 |
| 5,557,412 A | 9/1996 | Saito et al. | 358/296 |
| 5,557,416 A | 9/1996 | Sasanuma | 358/300 |

*Primary Examiner*—Scott Rogers
(74) *Attorney, Agent, or Firm*—Fitzpatrick, Cella, Harper & Scinto

(57) ABSTRACT

In case of performing an image process on an input image by selectively using plural conversion (halftone process) methods, a main object of the invention is to add, even if the plural conversion methods are switched and used, appropriate additional information according to each conversion method. To attain the object, there is provided an image process apparatus especially comprises an addition means for adding in a selected addition method the information to the image signal in a state that the added information is difficult to be perceived by human eyes. An another object is to add, even if the plural conversion methods are switched and used, the appropriate information according to a predetermined position or period. To attain the object, there is provided the apparatus especially comprises an addition means for adding the information in the above difficult-perceiving state according to a spatial frequency of a halftone cell corresponding to a halftone process method and an image-signal writing start position. A still another object is to add, even if the plural conversion methods are switched and used, the appropriate additional information suitable for all the conversion methods. To attain the object, there is provided the apparatus especially comprises an addition means for adding a pattern obtained by combining plural dots each composed of first and second areas of which longitudinal directions are different such that the pattern represents the additional information, to the input image signal in the above difficult-perceiving state.

28 Claims, 26 Drawing Sheets

FIG. 3A

1 PIXEL

| 14 | 6 | 10 | 15 |
|----|---|----|----|
| 9 | 1 | 2 | 7 |
| 5 | 4 | 3 | 11 |
| 13 | 12 | 8 | 16 |

1 PIXEL

FIG. 3B

|  | 10 | 14 |  |  |
|--|----|----|--|--|
|  | 9 | 2 | 3 | 11 |
| 17 | 8 | 1 | 4 | 15 |
| 13 | 7 | 6 | 5 |  |
|  |  | 16 | 12 |  |
|  |  | 18 |  |  |

IMAGE PROCESS APPARATUS, IMAGE PROCESS METHOD AND STORAGE MEDIUM

BACKGROUND OF THE INVENTION

1. Field of the Invention

The present invention relates to image process apparatus and method for adding predetermined additional information to an input image, and a storage medium for storing the image process method.

2. Related Background Art

In recent years, since performance of an image process apparatus such as a color printer, a color copy machine or the like has been improved, the image process apparatus has become possible to form a high-quality image. In such condition, since there is some fear that a negotiable paper such as a bank note or the like is forged, various forgery prevention techniques have been developed.

As one of these techniques, there is such an addition system (or add-on system) as a dot pattern representing additional information such as a machine number of the image process apparatus or the like is printed in addition to a color image.

Since this dot pattern is periodically printed on an entire image plane, the additional information is added to only an yellow printing plane.

Further, in recent years, to save a data amount handled in a host computer or a printer or to cause the printer to print a high-quality halftone image, various kinds of conversion methods (i.e., halftone process methods) such as a dither method, an error diffusion method and the like have been selectively executed.

In such condition, since each image process apparatus has only one of the above various add-on systems, the image process apparatus always adds on the additional information by using one system.

Therefore, for example, there is a case where the predetermined add-on system is not suitable for a certain conversion method (i.e., halftone process method) such as a dither process or the like in the plural conversion methods. In this case, there is a problem that it is difficult to read the add-on image and thus analyze the contents of the additional information. This is because, even if the dot pattern is buried in the image after performing the conversion process such as the dither process or the like, a position at which the dot pattern was buried can not be judged or found from the after-processed image.

Further, in a case where affinity between the conversion method and the add-on system is wrong, the dot pattern is remarkable on the image which was printed by using such the conversion method (i.e., halftone process method). Therefore, there is also a problem that image quality of such the image is substantially deteriorated.

SUMMARY OF THE INVENTION

The present invention was made in consideration of the above-described related background art, and a main object thereof is to enable, in a case where an input image is image-processed selectively by using plural conversion methods (i.e., halftone process methods), a user to use the processed image as an original image by burying additional information in the input image without deteriorating image quality thereof as much as possible, and to enable the user to certainly decrypt or decode the additional information added to the input image.

Concretely, the object of the present invention is to add the appropriate additional information to the input image even if the plural conversion methods are switched and used.

In order to attain the above object, according to one preferred embodiment of the present invention, there is provided an image process apparatus comprising:

a generation means for generating an image signal;

an image conversion means for performing image conversion on the image signal by selectively using one of the plural image conversion methods;

a generation means for generating the predetermined additional information;

a selection means for selecting an additional method to add the predetermined additional information to the image signal, according to the image conversion method used when the image conversion means performs the image conversion on the image signal; and an additional means for adding, in the addition method selected by the selection means, the predetermined additional information to the image signal in a state that the added information is difficult to be perceived by human eyes.

An another object of the present invention is to add, even if the plural conversion methods are switched and used, the appropriate additional information to the input image according to a position or a period at which each conversion process is performed.

In order to attain the above object, according to one preferred embodiment of the present invention, there is provided an image process apparatus comprising:

a halftone process means for generating an image signal, and performing a halftone process on the image signal by selectively using one of plural halftone process methods;

a generation means for generating the predetermined additional information; and an addition means for adding the predetermined additional information to the image signal in the state that the added information is difficult to be perceived by the human eyes, according to a spatial frequency of a halftone cell corresponding to the halftone process method selected by the halftone process means and a writing start position of the image signal.

A still another object of the present invention is to add, even if the plural conversion methods are switched and used, the additional information to the input image suitable for all the conversion methods.

In order to attain the above object, according to one preferred embodiment of the present invention, there is provided an image process apparatus comprising:

an input means for inputting an image signal; and an addition means for adding a pattern which is obtained by combining plural dots each composed of first and second areas of which longitudinal directions are different from each other such that the pattern represents the additional information, to the image signal inputted by the input means, in the state that the added pattern is difficult to be perceived by the human eyes.

The above and other objects, features, and advantages of the present invention will be apparent from the following detailed description and the appended claims in conjunction with the accompanying drawings.

BRIEF DESCRIPTION OF THE DRAWINGS

FIGS. 3A and 3B are views showing dither matrices handled by the image process apparatus;

FIGS. 7A, 7B and 7C are views showing states in cases where the dot sets were actually added on;

DETAILED DESCRIPTION OF THE PREFERRED EMBODIMENTS

First Embodiment

In the present embodiment, especially, structure of an image process apparatus using a color electrophotographic technique will be explained. In the present embodiment, it is assumed that image signals of M (magenta), C (cyan), Y (yellow) and BK (black) are plane-sequentially sent, and an input density level of each color is represented by eight bits. Further, it is assumed that the image process apparatus has resolution of 600 dpi, and a dot pattern representing additional information such as a machine number or the like of the apparatus is added on to only a Y plane.

Figure 1:
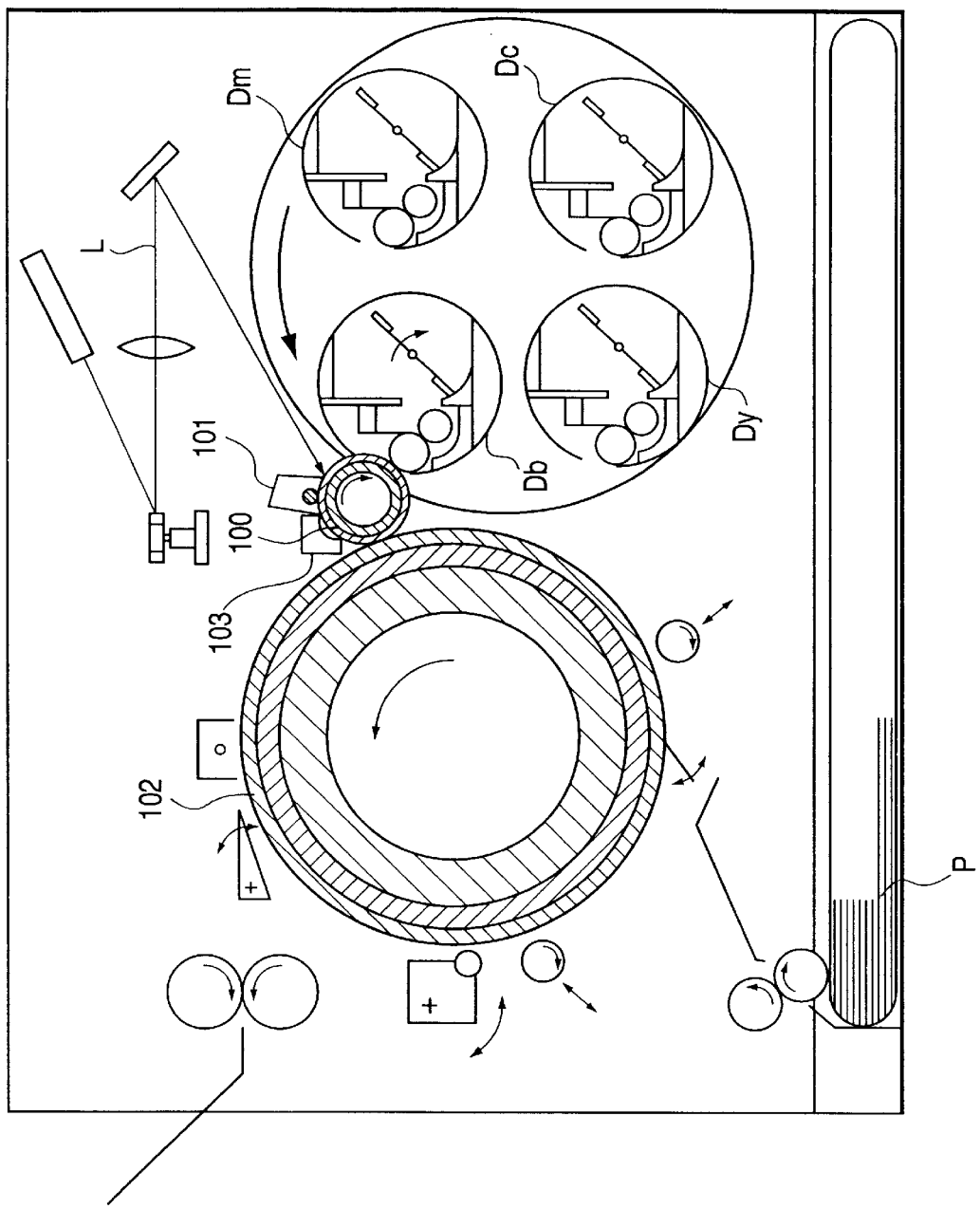
FIG. 1 is a view showing structure of a printer unit of an image process apparatus used in first and second embodiments of the present invention.

FIG. 1 shows an example of the structure of the color image process apparatus for explaining such the present embodiment as follows. This apparatus is so-called a laser beam printer. Initially, a photosensitive drum 100 is uniformly charged at a predetermined polarity by a charger 101. Then, e.g., a first latent image (assumed as magenta image in the present embodiment) is formed on the photosensitive drum 100 by exposure of a laser beam L. Subsequently, in this case, a predetermined development bias voltage is applied to only a magenta development unit $D_m$ to develop the magenta latent image, whereby a first toner image of magenta is formed on the photosensitive drum 100.

On the other hand, a transfer paper P is supplied at predetermined timing. Then, immediately before a leading edge of the supplied paper P reaches a transfer start position, a transfer bias voltage (+1.8 KV) of a polarity (e.g., plus) opposite to that of a toner is applied to a transfer drum 102, whereby the first toner image on the photosensitive drum 100 is transferred to the transfer paper P, and further the transfer paper P is electrostatically attracted to a surface of the drum 102. After then, the residual magenta toner on the drum 100 is eliminated by a cleaner 103 to stand by the latent image formation and development process for a next color.

Subsequently, a second latent image (assumed as cyan in the present embodiment) is formed on the photosensitive drum 100 by using the laser beam L, and then the second latent image on the drum 100 is developed by a cyan development unit $D_c$ to form a second toner image of cyan. This second toner image is transferred to the transfer paper P such that a position of the second toner image is registered (or coincided) with that of the first toner image of magenta already transferred on the paper P. When this toner image of the second color is transferred, the bias voltage of +2.1 KV is applied to the transfer drum 102 immediately before the transfer paper P reaches a transfer unit.

Similarly, third and fourth latent images of yellow and black are sequentially formed on the photosensitive drum 100 and then sequentially developed by yellow and black development units $D_y$ and $D_b$, respectively. Then, third and fourth toner images of yellow and black are sequentially transferred to the transfer paper P such that positions of these images are registered with that of the toner images previously transferred to the paper P. Therefore, the four-color toner images are formed on the transfer paper P in the state that these images are registered. In the present embodiment, the four colors are registered for the first time on the transfer paper P. However, the four-color toner images may be collectively transferred on the paper P after registering them on the transfer drum 102.

Subsequently, a PWM (pulse width modulation) system of the image process apparatus in the present embodiment will be described. In the PWM system, input data is once converted into an analog voltage, the converted voltage is compared with a triangular wave to convert it into pulse-width data, the obtained data is transferred to a laser driver unit, and then the laser beam is generated by a time corresponding to a pulse width.

Figure 2:
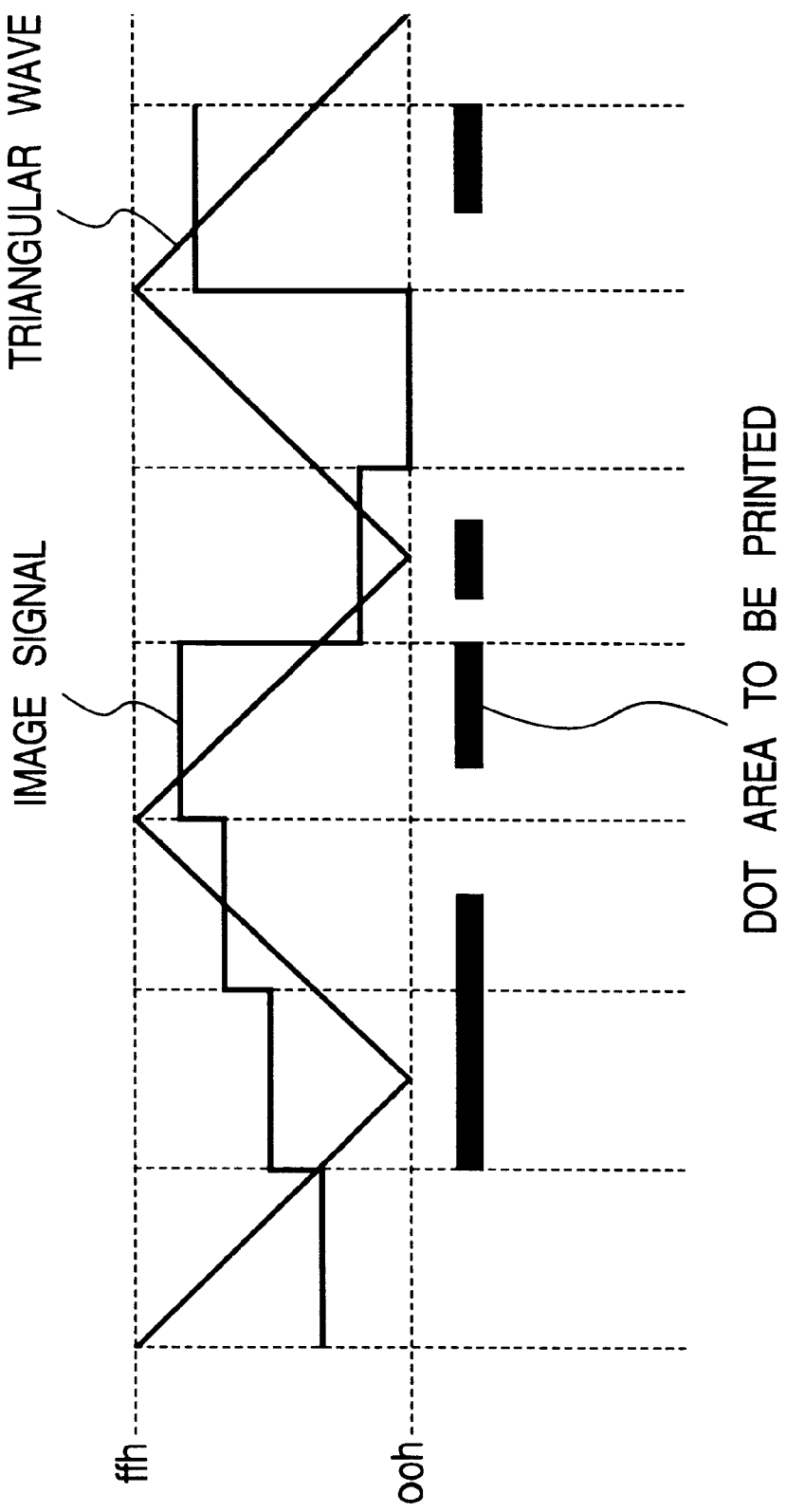
FIG. 2 is a view for explaining a PWM (pulse width modulation) process performed by the image process apparatus.
Figure 4A:
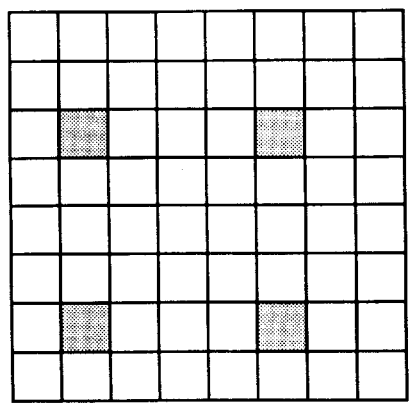
FIGS. 4A, 4B, 4C, 4D, 4E and 4F are views showing a printing example using the dither matrix.
Figure 4B:
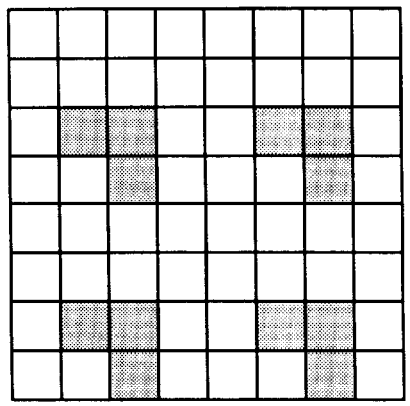
Figure 4C:
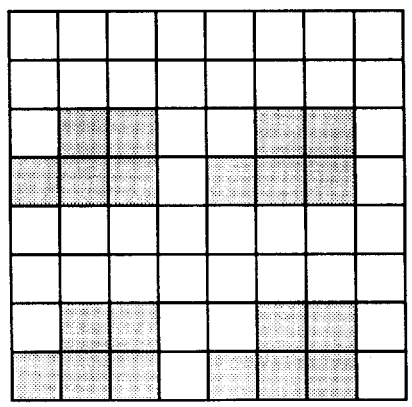
Figure 4D:
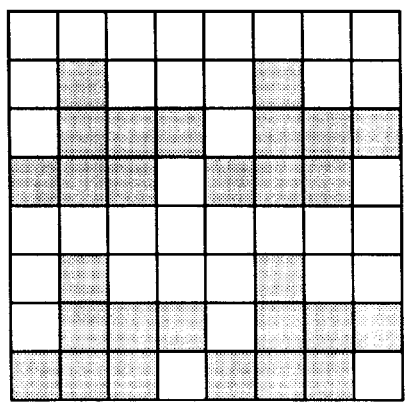
Figure 4E:
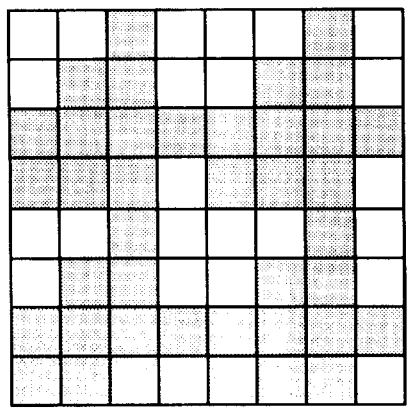
Figure 4F:
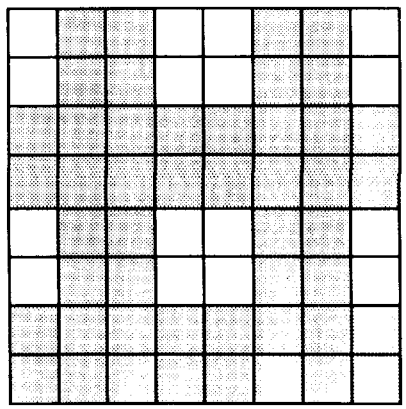
Figure 5A:
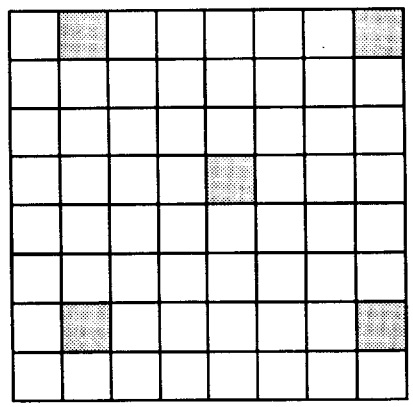
FIGS. 5A, 5B, 5C, 5D, 5E and 5F are views showing a printer example using the dither matrix.
Figure 5B:
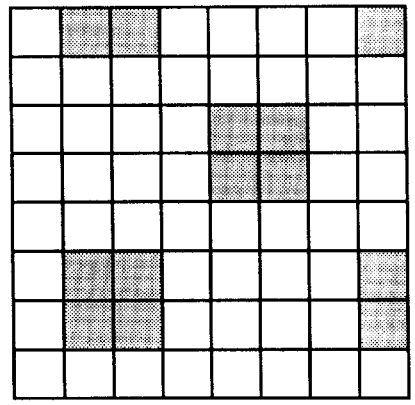
Figure 5C:
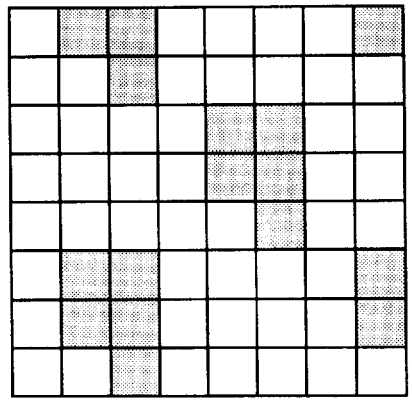
Figure 5D:
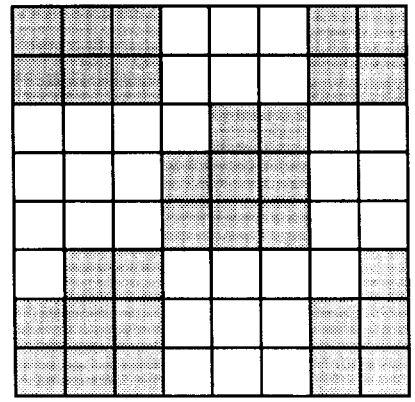
Figure 5E:
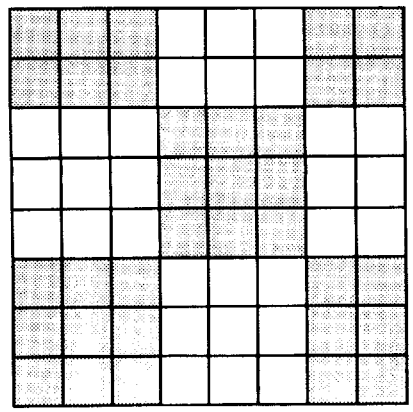
Figure 5F:
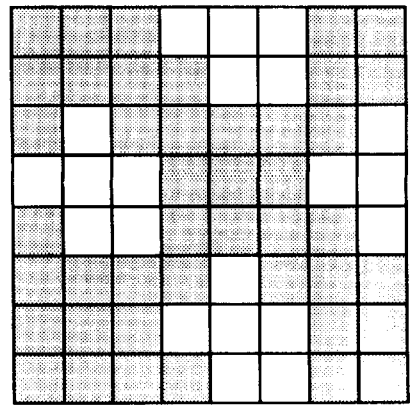

FIG. 2 shows a principle of the PWM. As described above, in the present embodiment, the image signal processed by the image process apparatus has the resolution of 600 dpi, and the triangular wave for the PWM has a wavelength of 200 lines. In FIG. 2, a distance between two dotted lines corresponds to a length of one pixel, and each axis of ordinate represents the analog voltage to each pixel and also corresponds to a density level (i.e., from minimum voltage to maximum voltage). The laser beam is irradiated for a time during which the analog voltage is higher than the triangular wave. Therefore, the toner is mounted on a portion of each pixel to which the laser beam was irradiated, whereby such the portion is printed.

On the other hand, a systematic dither method performed by an image process unit in the image process apparatus of the present embodiment will be described.

FIGS. 3A and 3B are views showing first and second dither matrices handled by the image process apparatus of the present embodiment. In FIGS. 3A and 3B, a numeral in each cell (or box) represents a threshold value in the dither matrices, and the value of the input image signal is compared with the threshold value. If the image signal of one pixel is equal to or larger than the threshold value, this pixel is considered as a black pixel. On the other hand, if the image signal of one pixel is smaller than the threshold value, this pixel is considered as a white pixel.

FIGS. 4A to 4F are views showing a printing example of the images subjected to a first dither process. In the drawings, black-colored cells represent the black pixels, and the density increases in the order of FIGS. 4A to 4F. By the first dither process, a halftone cell of 150 lines and a screen angle 0° is formed.

Like FIGS. 4A to 4F, FIGS. 5A to 5F are views showing a printing example of the images subjected to a second dither process. By the second dither process, a halftone cell of 141 lines and an screen angle 45° is formed. It should be noted that these dither processes are performed on the four colors Y, M, C and BK respectively.

Figure 6A:
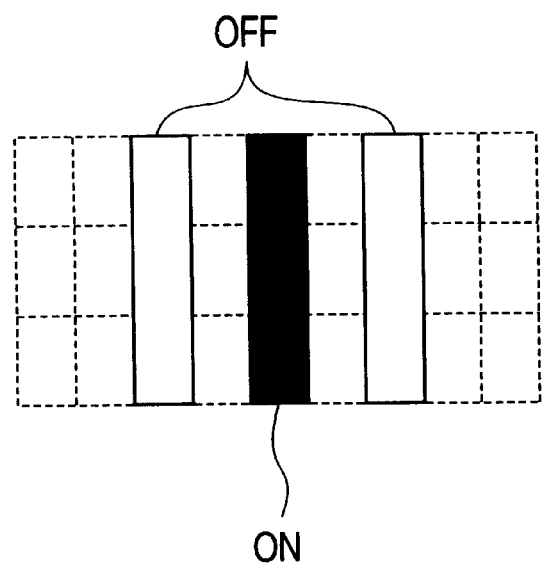
FIGS. 6A, 6B and 6C are views showing examples of plural dot sets contained in the image process apparatus.
Figure 6B:
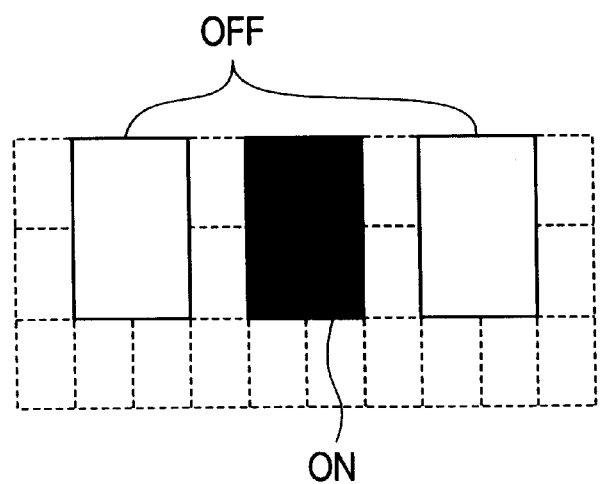
Figure 6C:
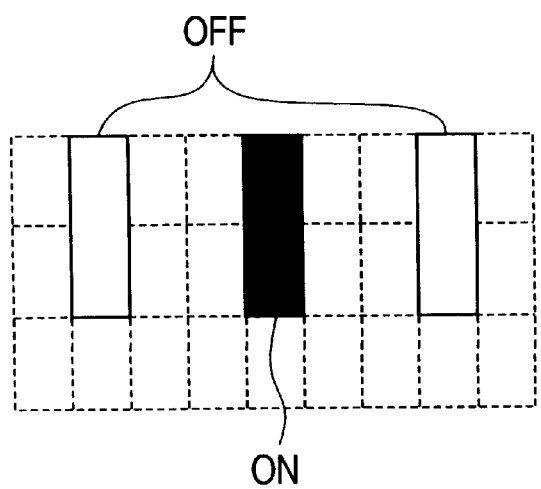

Subsequently, a dot pattern which represents the additional information to be added on to the original (i.e., essential) image by the image process apparatus in the present embodiment will be described. A combination of "on state" and "off state" (respectively referred as ON and OFF hereinafter) of the yellow dots as shown in FIG. 6A, 6B or 6C is considered as one unit of this dot pattern. In this case, such the combination is called as a dot set. When the plural dot sets of the same kind are combined with others, the additional information can be represented based on positional relationship of these dot sets. In the drawings, a black rectangular area represents a pixel for making the yellow dot ON. That is, yellow pixel values within this black area are replaced by solid yellow. On the other hand, a white rectangular area represents a pixel for making the yellow dot OFF. That is, the yellow pixel values within this yellow area are replaced by "0". The image process apparatus in the present embodiment can selectively use the PWM process and the dither process.

Figure 7A:
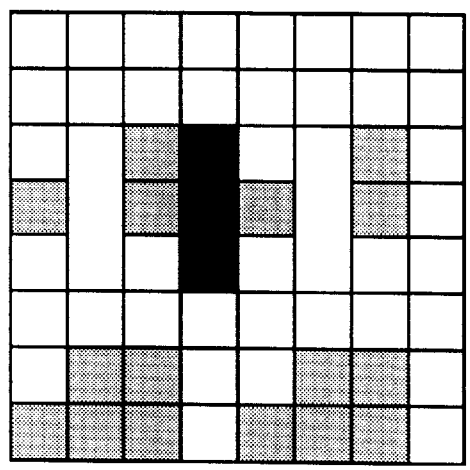

In the present embodiment, an addition system shown in FIG. 7A of the dot pattern using a dot set A is selected when the first dither process (FIGS. 4A to 4F) is performed. The number of lines of the halftone cell in the first dither process is relatively high, i.e., 150 lines. Namely, a size of each halftone dot is small. Therefore, in the dot set A, the ON and OFF areas are made small and a distance between the ON and OFF areas are set to correspond to the number of lines. FIG. 7A shows an example that the dot pattern using the dot set A is added on within the halftone cell of the first dither process, and corresponds to a state that the dot pattern is added on to the image of FIG. 4C. As shown in FIG. 7A, by placing the ON area between the halftone cells, it becomes easy to recognize the image.

Figure 7B:
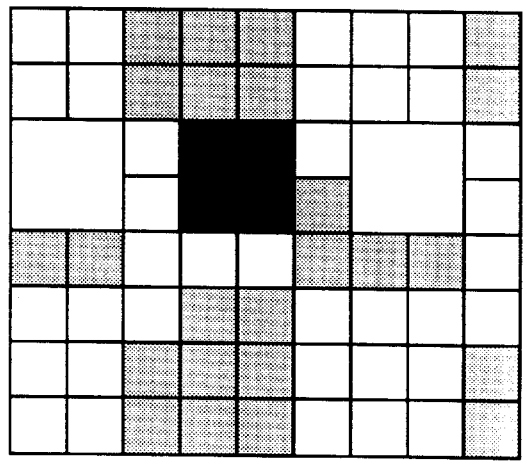

An addition system shown in FIG. 7B of the dot pattern using a dot set B is selected when the second dither process (FIGS. 5A to 5F) is performed. The number of lines of the halftone cell in the second dither process is relatively low, i.e., 141 lines. Namely, the size of each halftone dot is large. Therefore, in the dot set B, the distance between the ON and OFF areas are set to correspond to the number of lines such that the ON and OFF areas are made large. FIG. 7B shows an example that the dot pattern using the dot set B is added on within the halftone cell of the second dither process, and corresponds to a state that the dot pattern is added on to the image of FIG. 5D. Also, in this case, by placing the ON area between the halftone cells, it becomes easy to recognize the image.

Figure 7C:
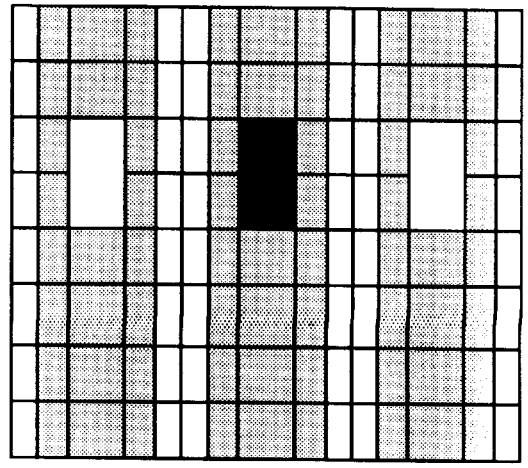

Finally, an addition system shown in FIG. 7C of the dot pattern using a dot set C is selected when the PWM process is performed. FIG. 7C shows an example that the dot set C is buried in the 200-line PWM process. The number of lines in the PWM process is 200 lines, and is highest as compared with the first and second dither processes. Namely, the size of each halftone dot is smallest. Therefore, in the dot set C, the ON and OFF areas are made smaller and further the distance between the ON and OFF areas are set to correspond to the number of lines. Further, as shown in FIG. 7C, by putting (or implanting) the OFF areas on the longitudinal lines of the PWM process, it becomes easy to recognize the image.

Figure 8:
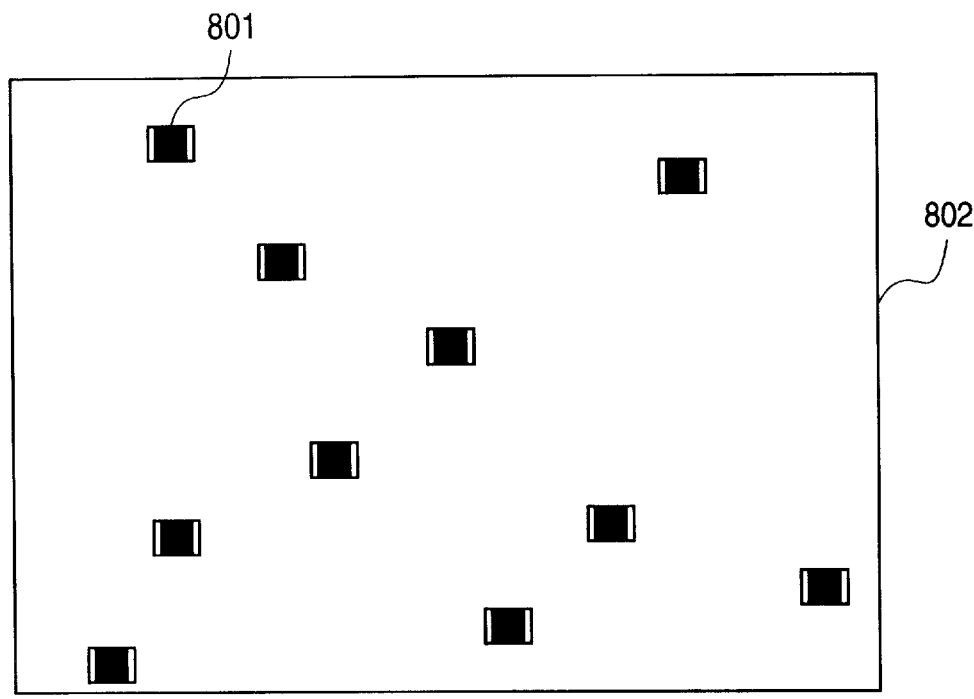
FIG. 8 is a view showing one unit of a dot pattern.

Subsequently, a printing method to print the dot pattern by using the plurality of any one of the above-described dot sets A, B and C will be explained with reference to FIG. 8. Reference numeral 801 denotes the dot set A, B or C, and one dot pattern 802 is formed by the combination of the plurality of the same dot set as shown in FIG. 8. This dot pattern 802 acts as one unit of the dot pattern, and by repeating this dot pattern 802 in the image, the additional information can be obtained from any area in the image.

Figure 9:
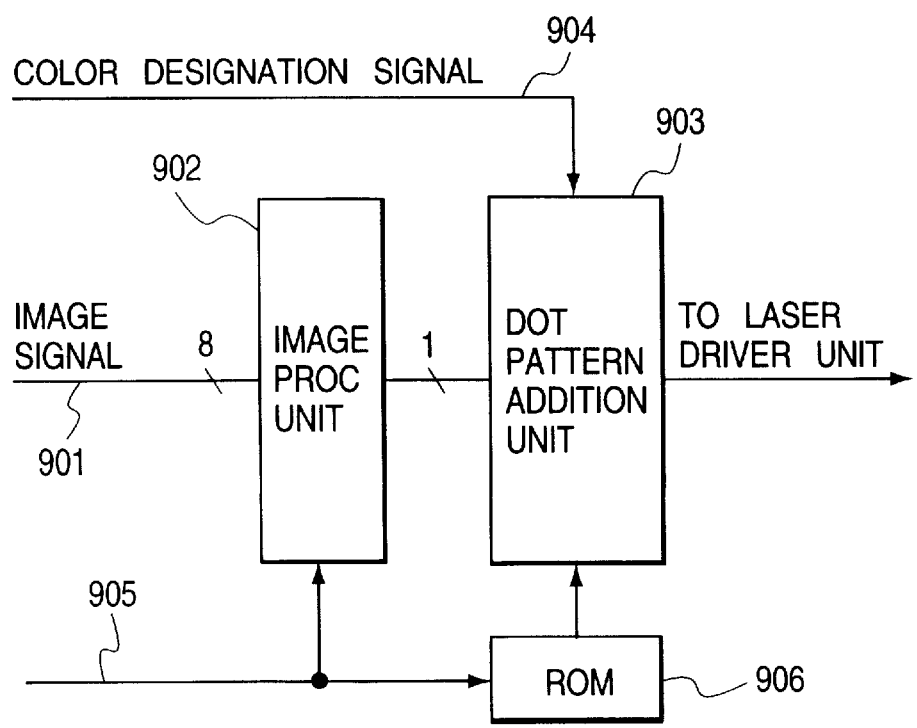
FIG. 9 is a block diagram showing structure for adding on additional information in a dither process.

The structure of put such the dot pattern as above will be described. Initially, FIG. 9 is a block diagram showing the structure to receive the image signal and then transfer the received signal to the printer unit in the dither process. As previously described, in order to print Y, M, C and BK planes one by one, the image process apparatus in the present embodiment plane-sequentially generates the image signals in the order of the M image signal of one plane, the C image signal of one plane, the Y image signal of one plane and the BK image signal of one plane. In this case, a color designation signal 904 designates which color image signal is to be sent. That is, the signal 904 initially designates the M image signal, and such designation is changed in the order of the C, Y and BK image signals every time the one-plane data is sent.

An image signal 901 of each color is inputted to an image process unit 902. Then the image process unit 902 selectively performs the first or second dither process responsive to a dither process designation signal 905. For example, this dither process designation signal 905 is manually designated by a user from a console unit (not shown) of the image process apparatus.

Figure 10:
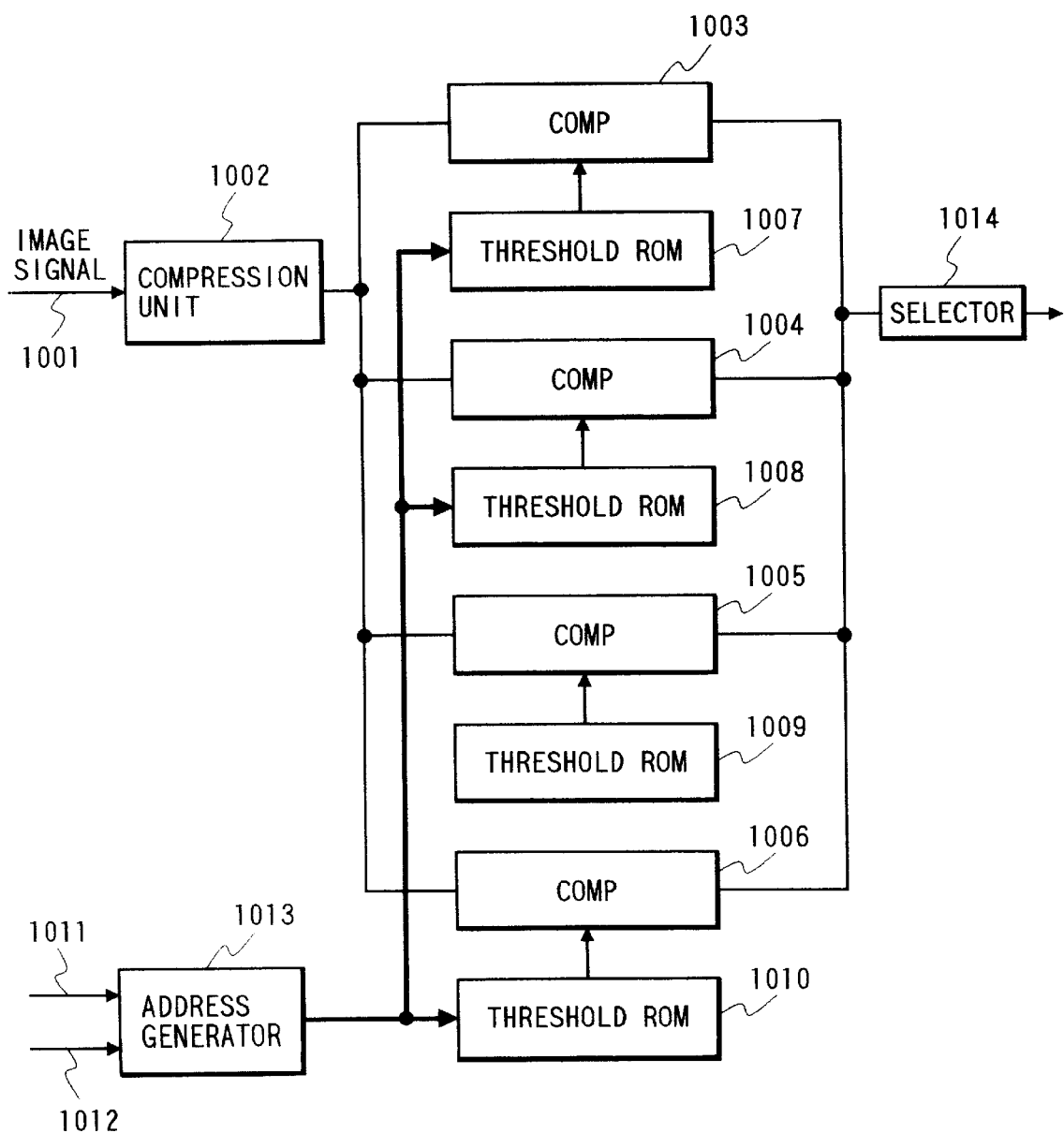
FIG. 10 is a block diagram showing internal structure of the image process apparatus shown in FIG. 9 to perform the dither process.

FIG. 10 shows the structure to perform the first dither process in the image process unit. Initially, an eight-bit image signal 1001 inputted is compressed by a compression unit 1002 to correspond to the gradation number in the dither process, and then inputted to comparators 1003 to 1006. At the same time of such the compression, a density correction is performed. On the other hand, a horizontal sync signal 1011 representing horizontal sync timing of the image signal and a reference clock 1012 are inputted to an address generator 1013. Then, responsive to these input signals, the address generator 1013 generates and outputs the address to threshold ROMs 1007 to 1010. The ROMs 1007 to 1010 are provided in correspondence with the comparators 1003 to 1006 respectively. The values corresponding to the threshold values shown in FIGS. 3A and 3B have been stored in the ROMs. When the address is rendered from the address generator 1013, the threshold value stored at this address is rendered to each input terminal of the corresponding comparators 1003 to 1006. Each of the comparators 1003 to 1006 compares the input image signal with the threshold value. Then, the comparator outputs a signal of H (high) level when the image signal is equal to or larger than the threshold value, and outputs a signal of L (low) level when the image signal is smaller than the threshold value. The signals outputted from the comparators in such the manner as above are supplied to a selector 1014 in parallel. The selector 1014 outputs a serial signal from the supplied parallel signals. Similarly, the second dither process is performed by the same system.

After the dither process, the image signal is inputted to a dot pattern addition unit 903 shown in FIG. 9. The three dot sets shown in FIGS. 6A to 6C have been stored in a ROM 906. Therefore, the data shown in FIG. 6A is loaded to the dot pattern addition unit 903 when the dither process designation signal 905 designates the first dither process, and the data shown in FIG. 6B is loaded to the unit 903 when the signal 905 designates the second dither process. Then, the dot pattern addition unit 903 adds the dot pattern to the input image signal only when the color designation signal 904 designates Y, but does not add any dot pattern when the signal 904 designates M, C or BK. Thus, the additional information (i.e, dot pattern) can be added on only to a part of colors which is difficult to be perceived by human eyes. It should be noted that the data of the three dot sets stored in the ROM 906 are all the same. For example, the information representing the machine number of the image process apparatus has been stored in the ROM 906.

After then, the image signal to which the dot pattern was added on is inputted to the laser driver unit and thus the printing is performed.

Figure 11:
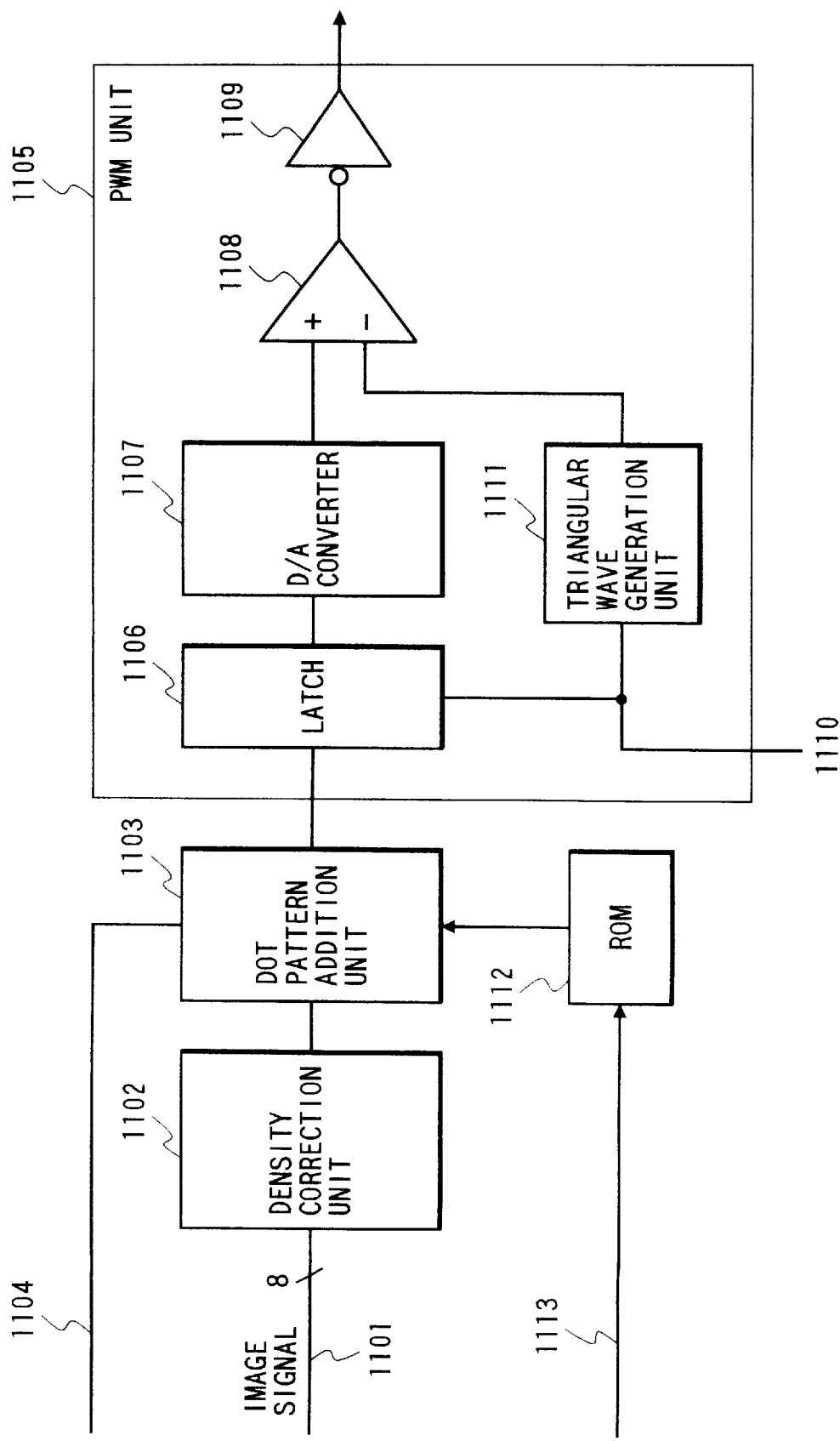
FIG. 11 is a block diagram showing structure for adding on the additional information in the PWM process.

Subsequently, FIG. 11 shows a block diagram showing a multivalue process unit in the image process apparatus to perform the PWM process. Like the dither process, an image signal 1101 is inputted in the order of M, C, Y and BK in response to a color designation signal 1104. Initially, the image signal 1101 is inputted to a density correction unit 1102, corrected such that relationship between the input image signal and an output density becomes linear, and then inputted to a dot pattern addition unit 1103. As previously described, the data corresponding to the three dot sets shown in FIGS. 6A to 6C have been stored in a ROM 1112. In this case, since a process designation signal 1113 designates the dot set of FIG. 6C, the data of FIG. 6C is loaded to the dot pattern addition unit 1103. The addition unit 1103 adds the dot pattern to the input image signal only when the color designation signal 1104 designates Y, but does not add the pattern when the signal 1104 designates M, C or BK.

Such the processed image signal of each color is inputted to a PWM (pulse width modulation) unit 1105. In the PWM unit 1105, the eight-bit image signal is converted into an analog voltage by a D/A converter 1107 in synchronism with a rise of an image clock PCLK 1110, and the obtained analog voltage is inputted to an analog comparator 1108.

On the other hand, a triangular wave is generated by a triangular wave generation unit 1111 based on the image clock PCLK 1110, and the obtained triangular wave is inputted to the analog comparator 1108. Then, the comparator 1108 compares the two signals, i.e., the analog voltage and the triangular wave, and outputs the PWM-processed image signal from its output terminal. After then, the image signal outputted is inverted by an inverter 1109, and thus a PWM signal is obtained.

In the above-described present embodiment, the example concerning the laser beam printer has been explained. However, in the image process of the present embodiment, to use the plural add-on systems according to the dither process can be applied to a various-type printer such as an ink jet printer, an LED printer or the like.

As described above, according to the present embodiment, by changing (or switching over) the add-on systems according to the image process method, the additional information can be added on by using the add-on system suitable for the kind of the image to be printed.

Second Embodiment

Subsequently, an another embodiment of the present invention will be described. Like the first embodiment, an image process apparatus according to the present embodiment has a function to selectively perform the first or second dither process of FIG. 3A or 3B.

Figure 12A:
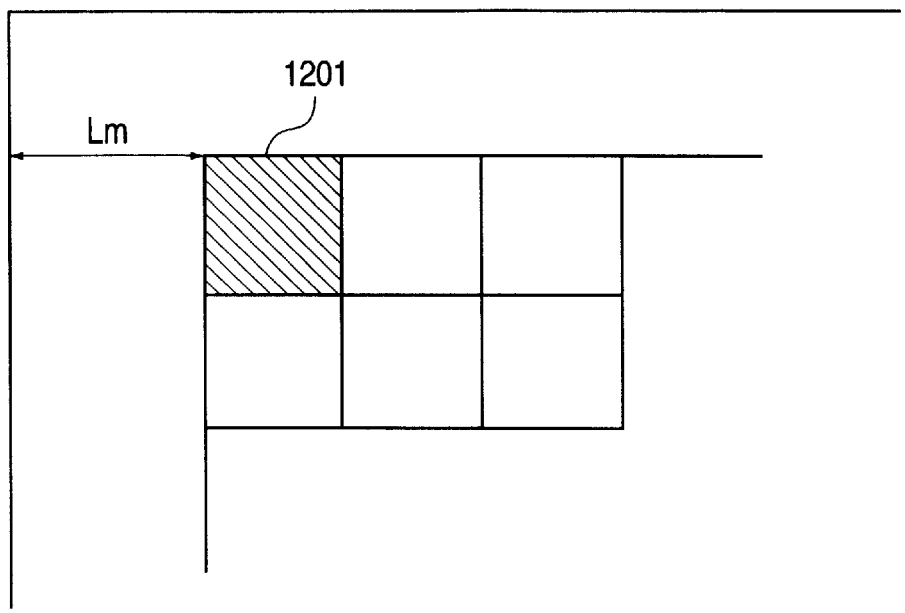
FIGS. 12A and 12B are schematic views showing halftone cells in the second embodiment.
Figure 12B:
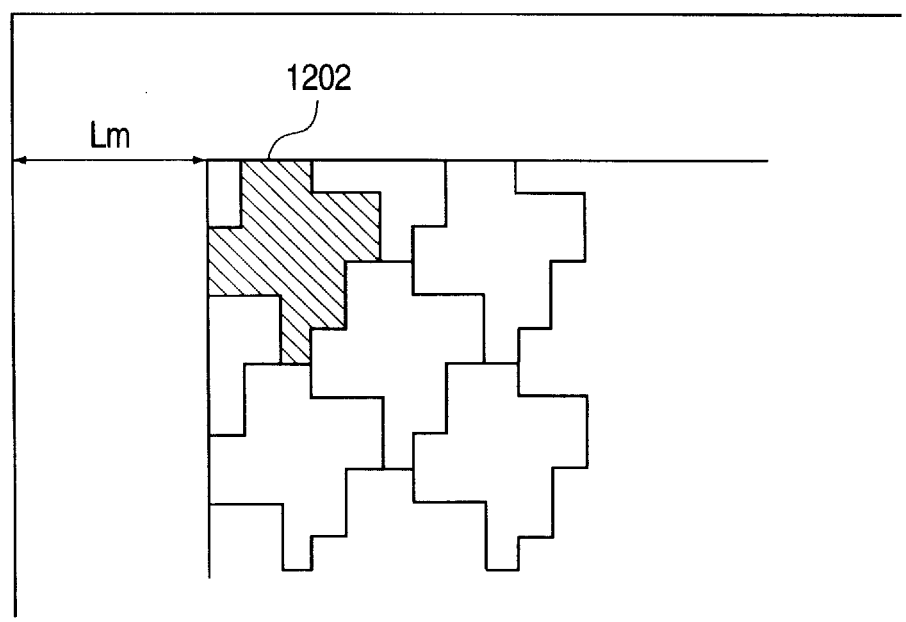

In the present embodiment, initially, based on a left margin value Lm of an image signal obtained from an externally connected host computer, a position of a halftone cell (i.e., dither matrix) in a dither process is obtained. That is, FIG. 12A schematically shows the halftone cell in a first dither process, and FIG. 12B schematically shows the halftone cell in a second dither process.

In the drawings, each of oblique-line areas 1201 and 1202 represents one unit of the halftone cell. These areas correspond to the dither matrices A and B in FIGS. 3A and 3B respectively. Since a left edge of an image area is decided based on the left margin Lm, the position of the halftone cell is also decided. Further, since the image data corresponding to an area of the left margin Lm is outputted as white data, the halftone cell starts from a position advanced from a left edge of a paper by Lm pixels.

Figure 13A:
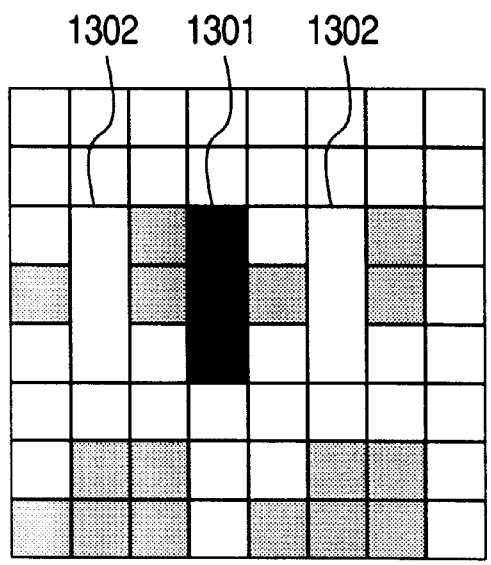
FIGS. 13A and 13B are views showing states that the dot sets are added on in the second embodiment.
Figure 13B:
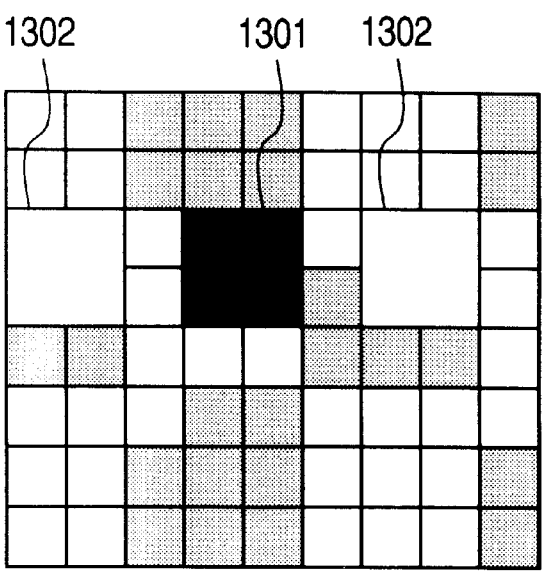
Figure 14A:
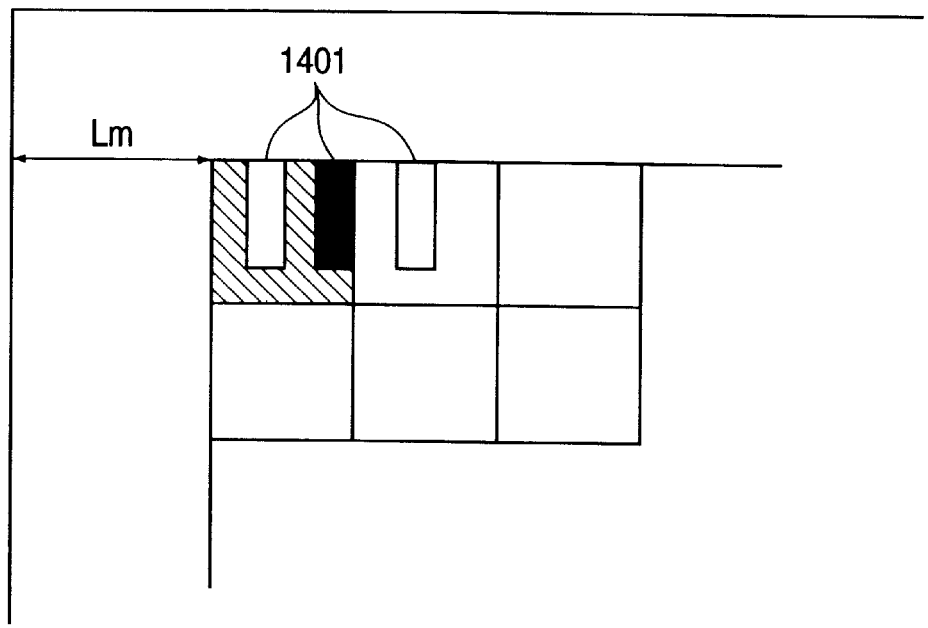
FIGS. 14A and 14B are views showing positional relationship between the halftone cells and the dot sets.
Figure 14B:
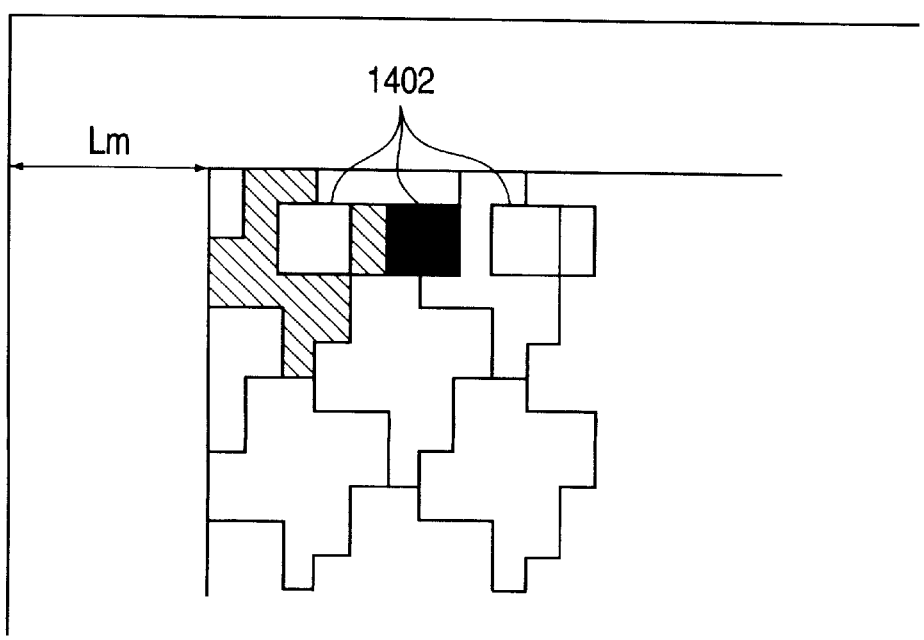

Like the first embodiment, as a dot pattern representing additional information, the dot patterns of FIGS. 6A and 6B respectively corresponding to the first and second dither processes have been stored and held in a ROM. In order to increase a recognition rate of the dot pattern, positional relationship between a dot set and the halftone cell is fixed as shown in FIGS. 13A and 13B respectively in the first and second dither processes, such that an area 1301 of which yellow dots are ON is positioned between halftone dots and areas 1302 of which yellow dots are OFF are positioned on the halftone dots. In order to do so, in the first dither process, the OFF area of a first dot set 1401 is set at a position shifted from the left edge of the halftone cell by one pixel in a main-scanning direction and at an upper edge of the halftone cell in a sub-scanning direction, as shown in FIG. 14A. Further, in the second dither process, the OFF area of a first dot set 1402 is set at a position shifted from the left edge of the halftone cell by two pixels in the main-scanning direction and at a position shifted from the upper edge of the halftone cell by one pixel in the sub-scanning direction, as shown in FIG. 14B.

In order to fix the positional relationship as described above, the position of the first dot set of the dot pattern in the main-scanning direction is set at (Lm+1)th pixel in the first dither process and at (Lm+2)th pixel in the second dither process, respectively. Further, the position of the first dot set of the dot pattern in the sub-scanning direction is set at a first line in the first dither process and at a second line in the second dither process, respectively.

Figure 15:
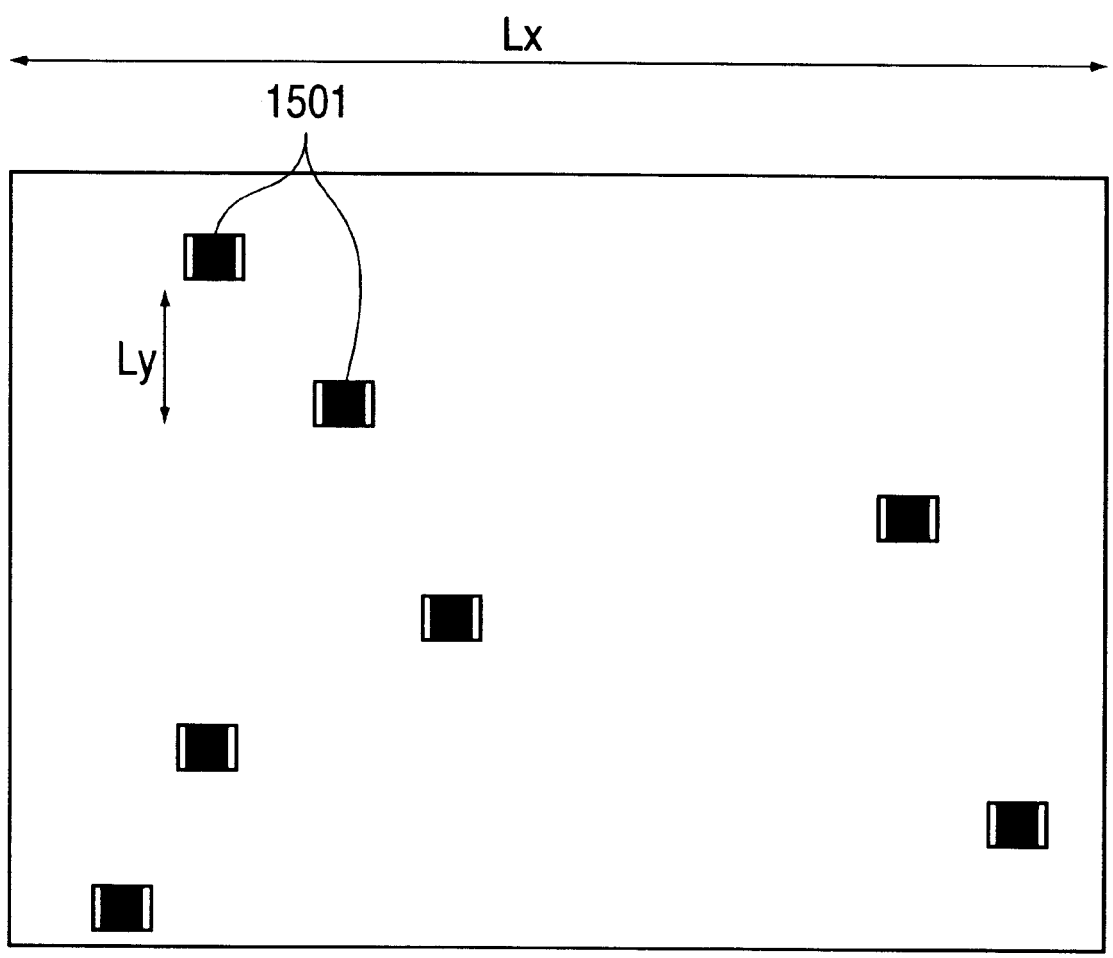
FIG. 15 is a view showing positional relationship of the dot sets in the dot pattern.
Figure 16A:
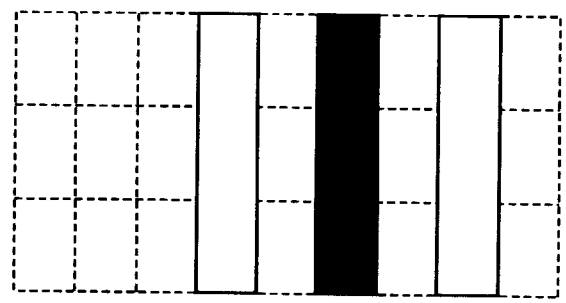
FIGS. 16A, 16B, 16C and 16D are views showing the plural dot sets of which positions are differed.
Figure 16B:
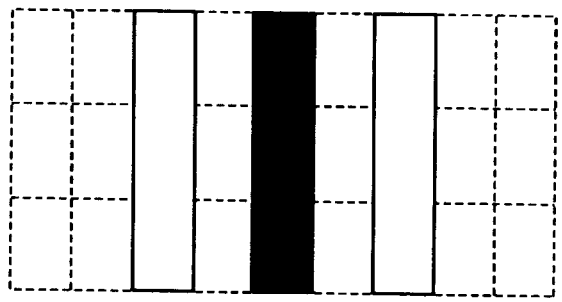
Figure 16C:
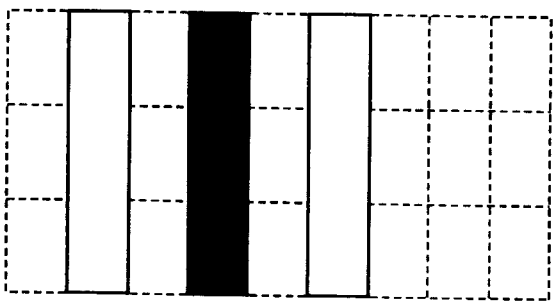
Figure 16D:
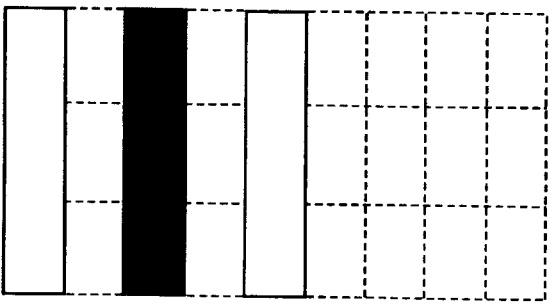

Subsequently, setting of a size of the dot pattern will be described. FIG. 15 shows one unit of the dot pattern, and reference numeral 1501 denotes each dot set. In the present embodiment, respective sizes Lx and Ly of the dot pattern in the main- and sub-scanning directions are variable, and respective upper-limit values Mx and My of the sizes Lx and Ly have been previously set.

The halftone in the first dither process has a spatial frequency of 150 lines in each of the main- and sub-scanning directions, i.e., a frequency of a four-pixel period in pixel number. For this reason, to realize the above positional relationship for each dot set, the sizes Lx and Ly are set to have maximum values being multiples of 4 and not exceeding the upper-limit values Mx and My respectively.

Similarly, the halftone in the second dither process has a spatial frequency of 141 lines, and also has a screen angle in a 45° direction. For this reason, to realize the above positional relationship for each dot set, it is necessary to shift the dot set in the unit of 100 lines both in the main- and sub-scanning directions. Therefore, in this case, the sizes Lx and Ly are set to have maximum values being multiples of 6 and not exceeding the upper-limit values Mx and My respectively.

The present embodiment has been described with respect to the case where the two kinds of the dither process systems are provided. However, if it is not yet determined what kind of image process a printer controller of the image process apparatus performs, by obtaining from the printer controller the information such as the spatial frequency, the screen angle, a margin value and the like, a writing start position of the first dot set and the sizes Lx and Ly can be calculated and set.

Further, although the writing start position of the dot set is controlled in the present embodiment, such the position may be fixed at the left edge of the paper. In this case, for example, it is possible in the first dither process to hold four dot sets each shifted by one pixel as in FIGS. 16A to 16D and selectively use any one thereof according to the left margin value.

Although one PWM process method is provided in the first embodiment, plural kinds of the PWM processes may be provided to be selectively used.

A method to perform the above operation of the image process apparatus is included in the scope of the present invention. Further, when this method has been stored as a program and a computer reads it to perform the above operation, a storage medium which stores this program is also included in the scope of the present invention.

As explained above, according to the first and second embodiments, when the image signal is subjected to the image conversion by selectively using one of the plural image conversion methods, the predetermined additional information is added to the image signal in the addition method according to the selected image conversion method. Therefore, it can be prevented that the added-on additional information can not be analyzed according to the conversion method of the input image.

Concretely, when the image conversion is performed by selectively using the dither process, the PWM process or the like, if the suitable-size dot pattern is added according to the number of lines of the processed image, it can be prevented that the added-on additional information can not be analyzed according to the conversion method of the input image.

Third Embodiment

In the present embodiment, especially, structure of an image record apparatus using a color electrophotographic technique will be described.

The image record apparatus in the present embodiment can perform printing at resolution of 600 dpi. Further, in the present embodiment, it is assumed that an image signal is plane-sequentially inputted from an external computer or the like in the order of M (magenta), C (cyan), Y (yellow) and BK (black), a density level of the image signal of each color is represented by eight bits, and a recognition signal to be added to the image signal is called as an add-on dot. Furthermore, in the present embodiment, it is assumed that the recognition signal is added only to the Y image signal, because, in M, C, Y and BK images, the Y image is most difficult to be perceived by human eyes. Therefore, even if the printing is performed with the recognition signal added, image quality of the printed image is not substantially deteriorated as compared with the original (i.e., essential) image.

Figure 17:
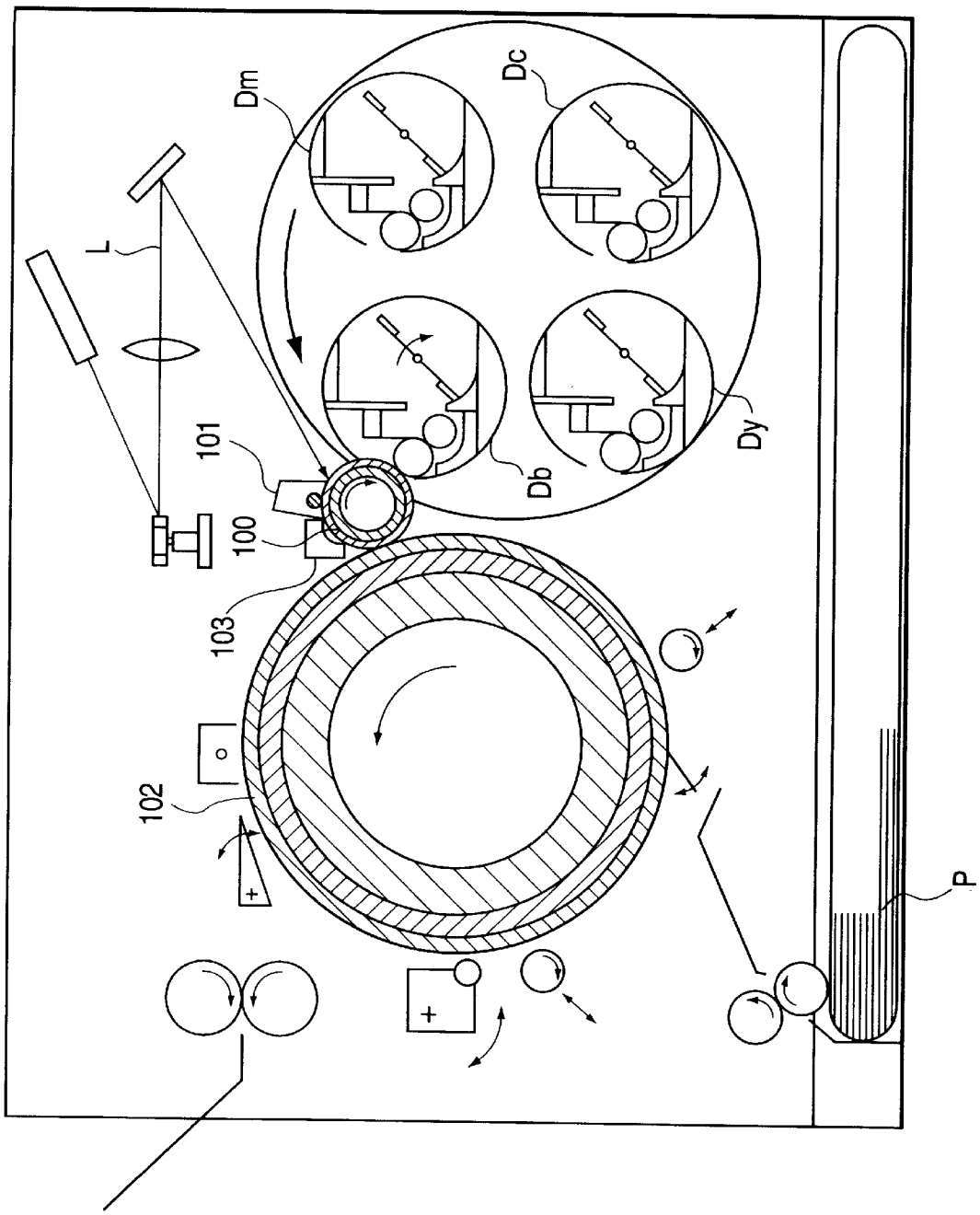
FIG. 17 is a view showing structure of a printer unit of an image process apparatus used in a third embodiment.

FIG. 17 shows the color image record apparatus used in the present embodiment.

Initially, a photosensitive drum 100 is uniformly charged at a predetermined polarity by a charger 101. Then, e.g., a first latent image of magenta is formed on the photosensitive drum 100 by exposure of a laser beam L. Subsequently, in this case, a predetermined development bias voltage is applied only to a magenta development unit $D_m$ to develop the magenta latent image, whereby a first toner image of magenta is formed on the photosensitive drum 100.

On the other hand, a transfer paper P is supplied at predetermined timing. Then, immediately before its leading edge reaches a transfer start position, a transfer bias voltage (+1.8 KV) of a polarity (e.g., plus) opposite to that of a toner is applied to a transfer drum 102, whereby the first toner image on the photosensitive drum 100 is transferred to the transfer paper P, and further the paper P is electrostatically attracted to a surface of the drum 102. After then, the residual magenta toner on the drum 100 is eliminated by a cleaner 103 to stand by the latent image formation and development process for a next color.

Subsequently, a second latent image of cyan is formed on the photosensitive drum 100 by using the laser beam L, and then the second latent image on the drum 100 is developed by a cyan development unit $D_c$ to form a second toner image of cyan. This second toner image is transferred to the transfer paper P such that a position of the second toner image is registered (or coincided) with that of the first toner image of magenta already transferred on the paper P. When this toner image of the second color is transferred, the bias voltage of +2.1 KV is applied to the transfer drum 102 immediately before the transfer paper P reaches a transfer unit.

Similarly, third and fourth latent images of yellow and black are sequentially formed on the photosensitive drum 100 and then sequentially developed by yellow and black development units $D_y$ and $D_b$ respectively. Then, third and fourth toner images of yellow and black are sequentially transferred to the transfer paper P such that positions of these images are registered with that of the toner images previously transferred to the paper P. Therefore, the four-color toner images are formed on the transfer paper P in the state that these images are registered.

Figure 18:
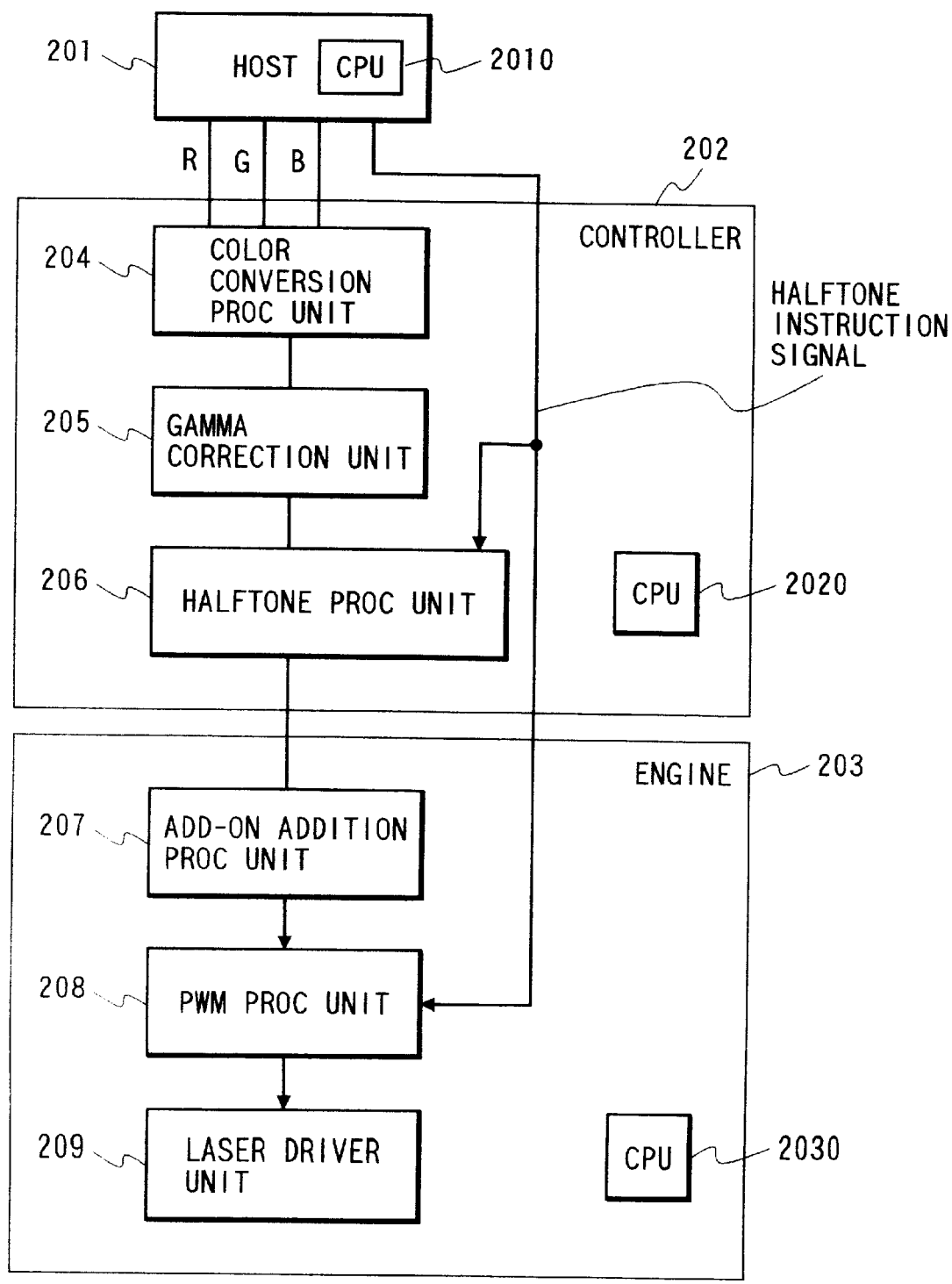
FIG. 18 is a block diagram showing data flows in a signal process.

FIG. 18 is a view showing data flows in a signal process of the third embodiment.

In FIG. 18, each of a host computer 201, a controller 202 and an engine 203 has an independent main control unit (CPU) for controlling each block within each device. That is, the host computer 201 has a CPU 2010, the controller 202 has a CPU 2020, and the engine has a CPU 2030. Each CPU controls operation timing in each device and communication among the devices through not-shown buses.

Generally, in the image process apparatus such as a laser beam printer used in the present embodiment, the controller unit and the engine unit are apt to be composed independently. Therefore, each device has generally the closed structure to be independently controlled.

R (red), G (green) and B (blue) image signals are outputted in parallel from the host computer 201 and then inputted to the controller 202. From the host computer 201, one of three kinds of halftone processes, called as a dither 1, a dither 2 and a superpixel, can be selectively indicated. In the printing, if the user selects any one of the halftone processes from a predetermined console unit of the host computer 201, a number of the selected halftone process is transferred to the controller 202 as a halftone instruction signal.

In the present embodiment, the halftone instruction signal is inputted to the controller 202 through a signal line which is dedicated to control signals and independent of a signal line dedicated to image signals. Thus, the control signal can be handled independently of the image signal, whereby freedom of transmission/reception timing of the signal increases.

The present invention is not limited to such the structure. That is, through the same data line, the halftone instruction signal and the image signal may be inputted as parallel commands.

In the controller 202, the CPU 2020, a color conversion process unit 204, a gamma correction unit 205 and a halftone process unit 206 are provided. The input R, G and B image signals are masking and UCR (under color removal) processed for the purposes of color correction and under color removal by the color conversion process unit 204. Then, the processed signals are converted into M (magenta), C (cyan), Y (yellow) and BK (black) image signals.

As previously described, since the image record apparatus plane-sequentially prints the Y, M, C and BK planes one by one, the image signals each corresponding to one plane are outputted from the color conversion process unit 204 in the order of M, C, Y and BK.

Then, the image signal outputted is corrected by the gamma correction unit 205 such that an output density curve becomes linear, and the corrected signal is inputted to the halftone process unit 206.

On the other hand, in parallel with such the operation, the halftone instruction signal is inputted to the halftone process unit 206. The unit 206 processes the input image data in accordance with the halftone instruction signal. When it is instructed to perform the dither 1 or the dither 2, a predetermined multivalue dither process later described in detail is performed. On the other hand, when it is instructed to perform the later-described superpixel, any dither process is not performed.

After the above process is performed by the controller 202, the image signals of M, C, Y and BK are inputted to the engine 203.

In the engine 203, the CPU 2030, an add-on addition process unit 207, a PWM process unit 208 and a laser driver unit 209 are provided. Only when the image signal of Y is inputted, an add-on pattern is added to the image signal by the add-on addition process unit 207. After then, the input image signal is subjected to pulse-width modulation by the PWM process unit 208.

The halftone instruction signal is inputted to the halftone process unit 206 and simultaneously to the PWM process unit 208 in the engine 203 based on a serial command or the like.

In the PWM process unit 208, if it is instructed by the halftone instruction signal to perform the dither 1 or the dither 2, a known PWM process is performed in the 600-line unit. On the other hand, if it is instructed to perform the superpixel, the PWM process is performed in the 200-line unit. Then, a modulated PWM signal is inputted to the laser driver unit 209 and printed.

Subsequently, the operation of the add-on addition process unit 207 will be explained.

Figure 20:
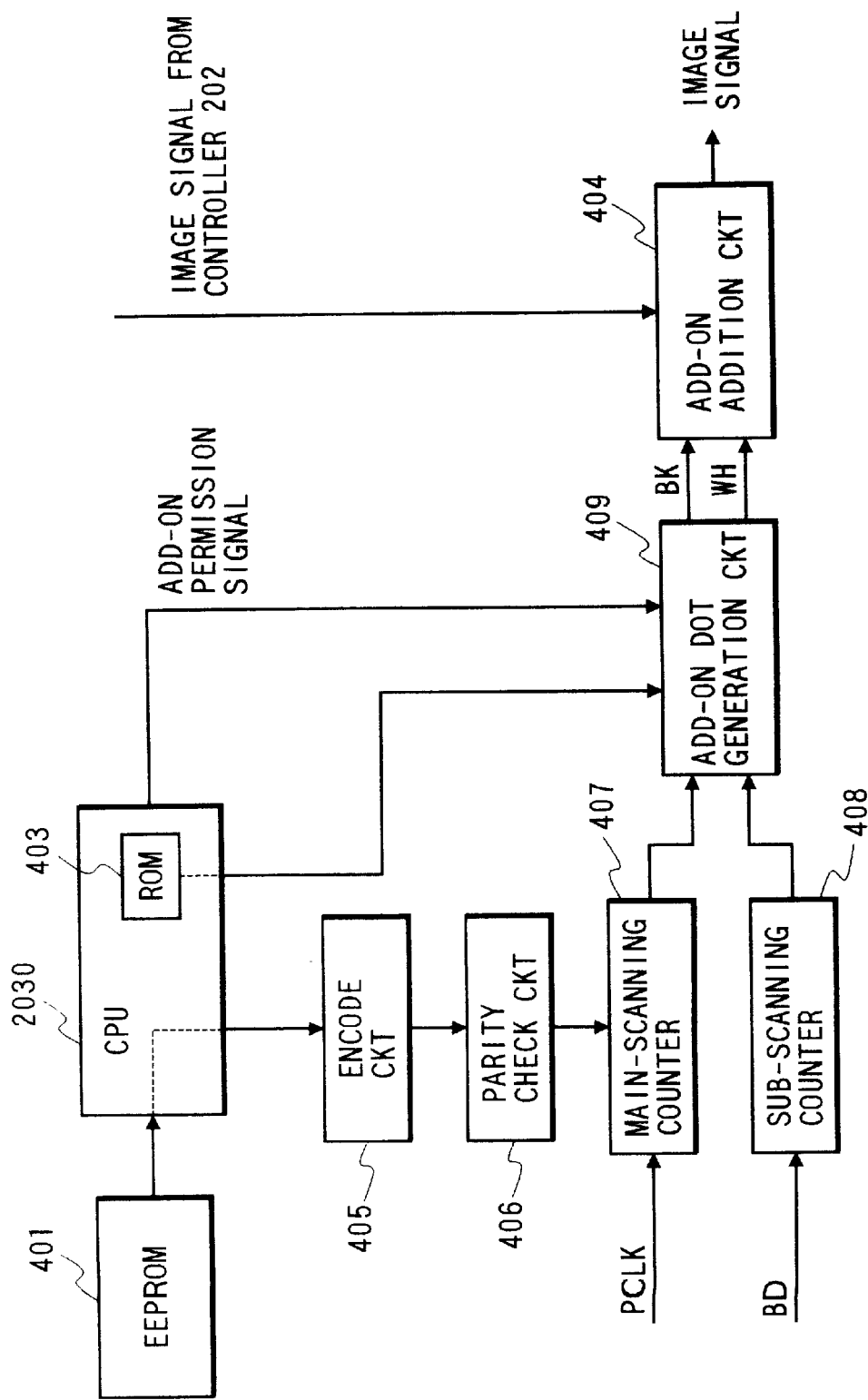
FIG. 20 is a block diagram showing an add-on addition process unit.

FIG. 20 is an internal block diagram of the add-on addition process unit 207. Hereinafter, the operation of the block will be briefly explained. The CPU 2030 reads addition information such as an engine ID or the like stored in an EEPROM (Electrically Erasable Programmable Read-Only Memory) 401, and outputs the read information to an encode circuit 405. The encode circuit 405 encodes this additional information. Then, parity data of the encoded information is checked by a parity check circuit 406. If an error is detected, a printing operation is stopped.

A main-scanning counter 407 performs counting according to a clock signal PCLK of the image signal in a main-scanning direction. Then, in accordance with a code loaded from the parity check circuit 406, the counter 407 sends an ON signal at a position to which an add-on dot should be added.

A sub-scanning counter 408 performs counting according to a clock signal BD in a sub-scanning direction, and sends the ON signal at an add-on line. An add-on dot generation circuit 409 receives an add-on dot shape parameter stored in a ROM 403 of a CPU 2030. Then, only in a case where an add-on permission signal becoming ON only when processing the yellow image signal is ON and both the main- and sub-scanning counters 407 and 408 send the ON signal, the add-on dot generation circuit 409 generates the add-on dot. That is, the circuit 409 makes a signal BK ON in an FF area and a signal WH ON in a 00 area, and then transfers such as the signal.

An add-on addition circuit 404 converts the yellow image signal inputted from the controller 202 into FFh if the signal BK is ON and into 00h if the signal WH is ON, and then outputs the converted signal to the PWM process unit 208. If both the signals BK and WH are OFF, the input image signal is outputted to the PWM process unit 208 as it is.

A state of the image to which the additional information was added by the above process will be described later.

Subsequently, the operation of the PWM process unit 208 will be explained.

Figure 19:
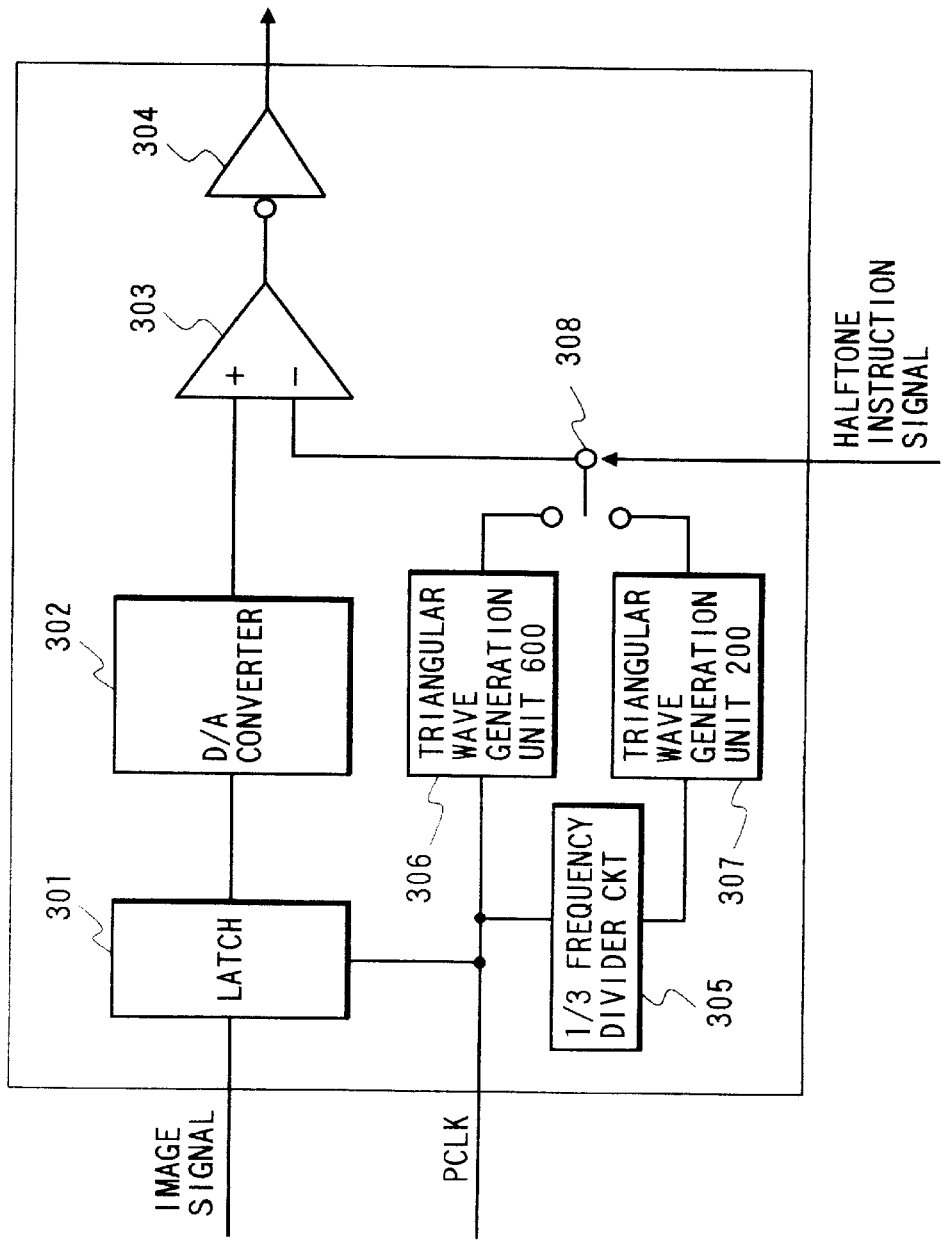
FIG. 19 is a block diagram showing a PWM process unit.

FIG. 19 is a block diagram showing the PWM process unit 208. In the drawing, the image signal inputted from the add-on addition circuit 404 is latched by a latch circuit 301 in synchronism with a rise of the image clock PCLK, the output from the circuit 301 is converted into the analog voltage by a D/A converter 302, and then the obtained analog voltage is inputted to an analog comparator 303.

On the other hand, based on the image clock PCLK, a 600-line triangular wave is generated by a triangular wave generation unit 306, and simultaneously a 200-line triangular wave is generated by a triangular wave generation unit 307 through a ⅓ frequency divider circuit 305.

In the operation, a line-number switch 308 is switched according to the halftone instruction signal. That is, if it is instructed by the halftone instruction signal to perform the dither 1 or the dither 2, the switch 308 selects the 600-line triangular wave. On the other hand, if it is instructed to perform the superpixel, the switch 308 selects the 200-line triangular wave.

The analog comparator 303 compares two signals, i.e., analog voltage and triangular wave. Then, the PWM processed signal is outputted from an output terminal of the comparator 303 and inverted by an inverter 304, thereby obtaining the PWM signal.

Next, the principle of the PWM performed by the PWM process unit 208 will be briefly explained.

Figure 23A:
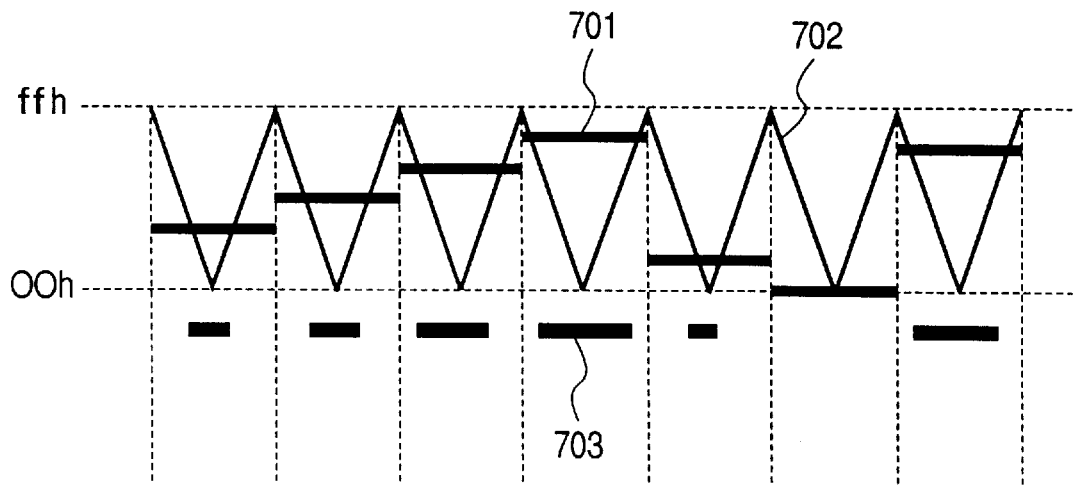
FIGS. 23A and 23B are views showing a principle of a PWM process.
Figure 23B:
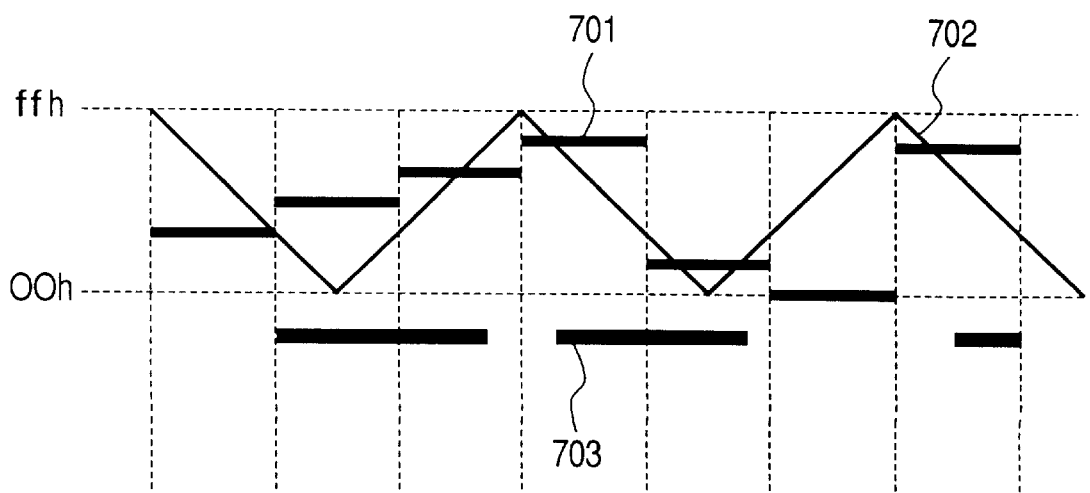

FIGS. 23A and 23B are views showing states of the 600- and 200-line PWM processes, respectively. In the drawing, a distance between adjacent dotted lines corresponds to a width of one pixel, and each axis of ordinate represents the analog voltage to each pixel and also corresponds to a density level (i.e., from minimum voltage to maximum voltage). A laser (corresponding to laser beam L in FIG. 17) is irradiated for a time during which an analog voltage (image signal) 701 is higher than a triangular wave 702. Therefore, the toner is mounted only on a portion (dot area to be printed) 703 of each pixel to which the laser was irradiated, whereby such the portion is printed.

In the 600-line PWM process of FIG. 23A, an irradiation area changes in the unit of one pixel to express gradation. On the other hand, in the 200-line PWM process of FIG. 23B, the gradation is expressed in the unit of three pixels.

Subsequently, the dither 1 and the dither 2 which are executable by the halftone process unit 206 in the present embodiment will be explained.

Figure 21A:
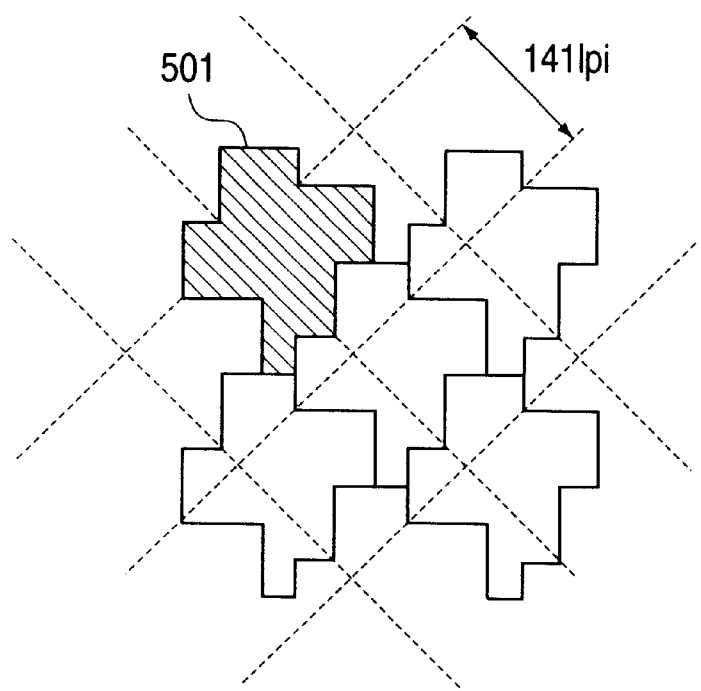
FIGS. 21A and 21B are views showing halftone cells in a dither process.
Figure 21B:
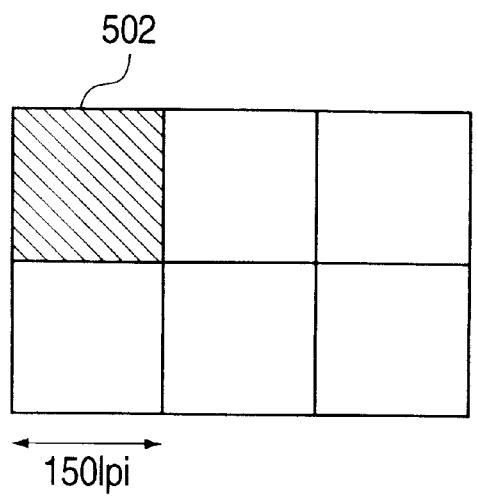

FIGS. 21A and 21B respectively show the halftone cells in the dither 1 and the dither 2. Reference numeral 501 denotes the halftone cell in the dither 1. The cell 501 has a screen angle of 45° and the number of screen dots (i.e., spatial frequency) of 141 lines/inch. The cell is a fattening-type cell and thus spirally grows from the center.

Reference numeral 502 denotes the halftone cell in the dither 2. The cell 502 has the screen angle 0° and the number of screen dots of 150 lines/inch. The cell longitudinally grows from the center.

Each pixel has a depth of, e.g., four gradations, and the gradation of each pixel is expressed by the 600-line PWM process. As a result, the halftone dot in an area of yellow density being about 25% which can be frequently seen on a bank note or the like comes to have a shape (FIG. 22A in the dither 1 and FIG. 22B in the dither 2).

On the other hand, if a superpixel mode is selected, the 200-line PWM process is performed. Therefore, the halftone dot in the area of yellow density being about 25% comes to have a shape shown in FIG. 22C.

When the add-on dot is added to the image to which each halftone process having such a characteristic as above was performed, positional relationship between the halftone dot and the add-on dot highly affects difficulty in decoding (or reading) or remarkability.

Since the relationship between the halftone dot and the add-on dot can be arbitrarily changed if the user changes a margin, it is impossible to control such the relationship by using the record apparatus (i.e., engine 203). Therefore, in consideration of the relationship wherein the add-on dot in the formed image is most difficult to be perceived and the relationship wherein the add-on dot is most remarkable in the formed image, it is necessary to determine the optimal shape of the add-on dot.

Figure 24:
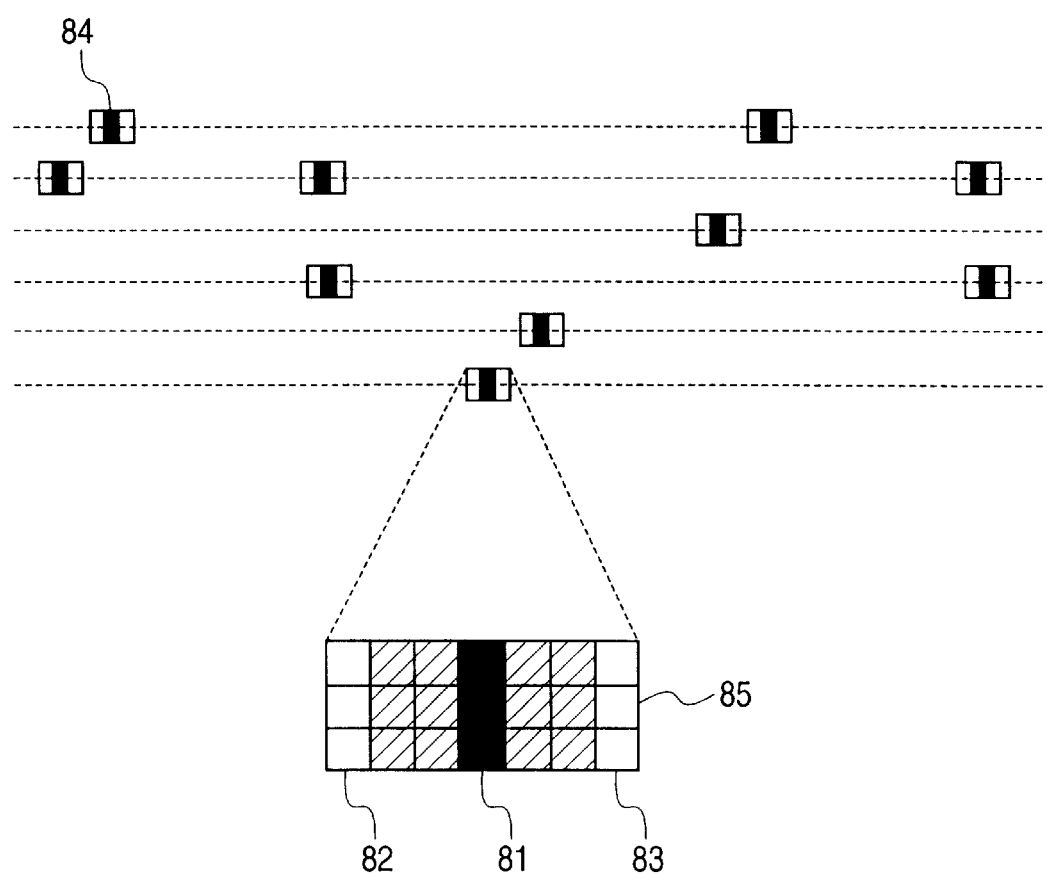
FIG. 24 is a view showing conventional add-on dots.

FIG. 24 shows an example of a shape of the conventional add-on dot. In the drawing, a dotted line represents an add-on line to which each add-on dot is to be added. Further, reference numeral 84 denotes each add-on dot.

Reference numeral 85 denotes the enlarged add-on dot 84. In the add-on dot 85, on an area corresponding to an FF area 81, the original input image is replaced with a maximum density (only for yellow-plane image). On areas corresponding to 00 areas 82 and 83, the original input image is replaced with a minimum density (only for yellow-plane image). That is, the pixels in the FF area are converted into FFh, and the pixels in the 00 areas are converted into 00h. On the other hand, the pixels in oblique-line areas are not modulated. Such the add-on dot is repeatedly added in the image.

It is assumed that the additional information is expressed by a combination of these plural add-on dots. For example, the information corresponding to several bits can be expressed by a distance of the add-on dots longitudinally or laterally adjacent to each other.

Figure 22A:
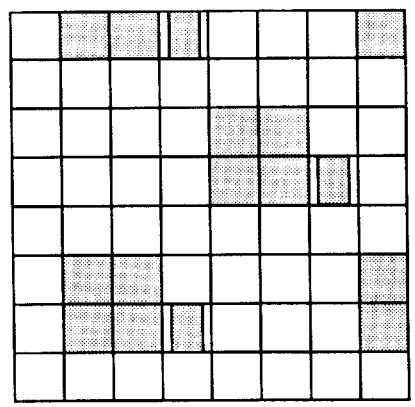
FIGS. 22A, 22B and 22C are views showing a printing example in a halftone process.
Figure 22B:
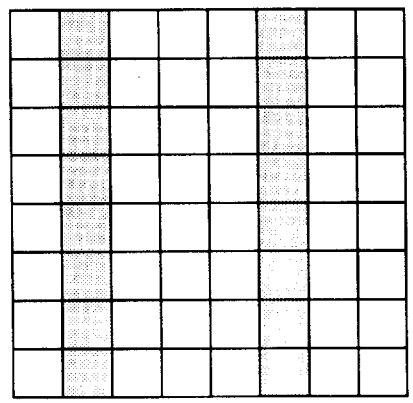
Figure 22C:
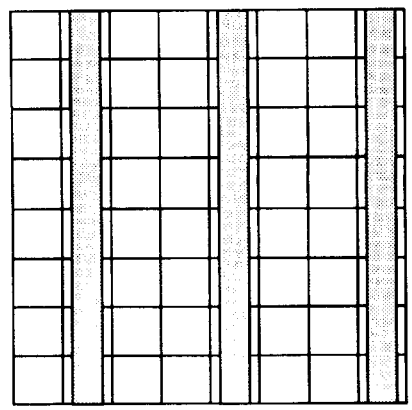
Figure 25A:
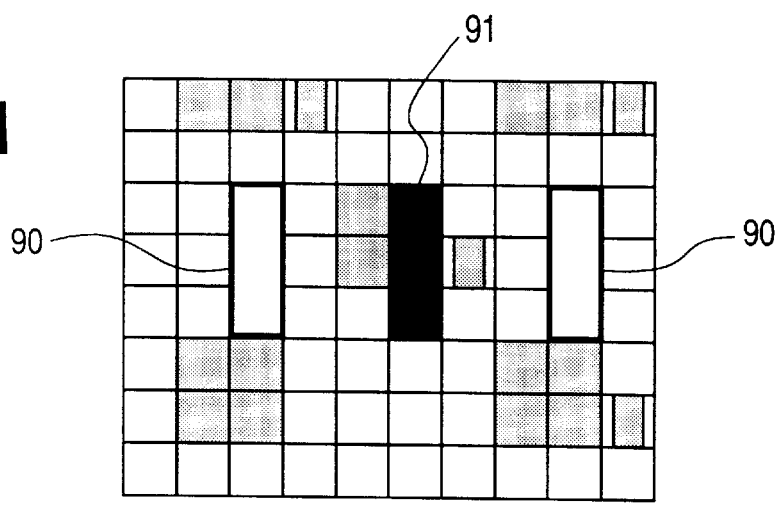
FIGS. 25A, 25B and 25C are views showing an example that the conventional add-on dots were added to each halftone dot.
Figure 25B:
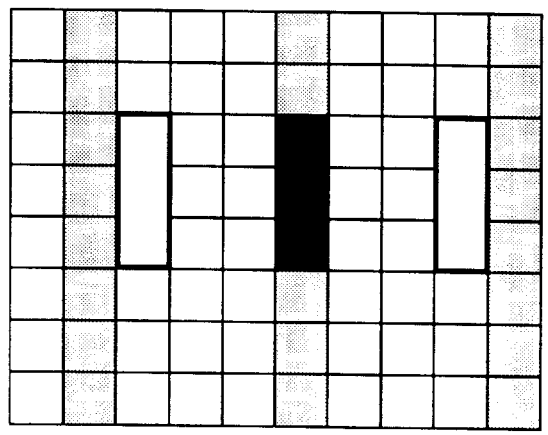
Figure 25C:
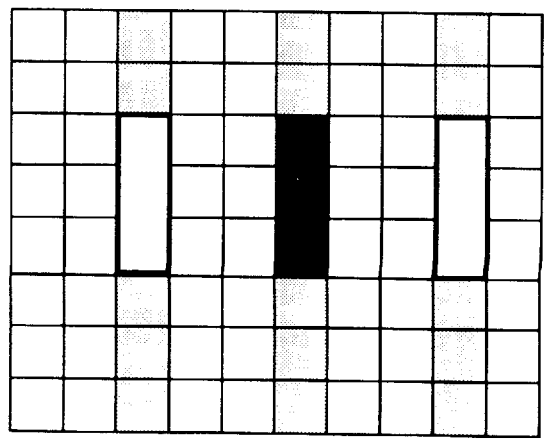

FIGS. 25A to 25C respectively show examples that the above conventional add-on dot is added to the respective halftone dots of FIGS. 22A to 22C. That is, printed results of the image signals obtained by performing the dither 1, the dither 2 and the superpixel are shown in FIGS. 25A, 25B and 25C respectively.

In FIG. 25A, since 00 areas 90 on both the sides overlap a white background of the original image, these areas can not be decoded and recognized from the printed image. An FF area 91 is partially projected from the halftone dot by one pixel. However, the FF area can not be decoded and recognized based on such a portion projected by only one dot.

In FIG. 25B, since all the FF area and the 00 areas overlap the original image, these areas can not be completely decoded and recognized from the printed image.

In FIG. 25C, since the three pixels in the original image are replaced with white by the 00 area, such the area can be decoded and recognized from the printed image, but instead the portions corresponding to the 00 areas are clearly remarkable as white blanks. Therefore, by the shape of the conventional add-on dot, it is not enough to satisfy both the recognition and the remarkability.

Especially, in the electrophotographic system, if the FF area is not projected from the halftone dot by at least two pixels such the area can not be recognized as a dot. For this reason, in order to certainly recognize the FF area even in such the case as in FIG. 22A, for example, the longitudinally arranged four pixels are necessary for the FF area. However, if the FF area has the area longitudinally expanding by five pixels or more, such the area becomes remarkable on the white background or the like. Therefore, in this case, the FF area is changed to that having the longitudinal size corresponding to the four pixels.

On the other hand, even if this FF area overlaps the longitudinal lines of the halftone dots shown in FIGS. 22B and 22C, movement of the 00 areas on both the sides becomes important to enable the add-on dots to be recognized.

Initially, in FIG. 22B, to enable the white blank to be recognized, it is necessary that the 00 area is at the position apart from the FF area four pixels in the main-scanning direction.

Unlike FIG. 22B, in FIG. 22C, to enable the white blank to be recognized, it is necessary that the 00 area is at the position apart from the FF area by three pixels in the main-scanning direction.

Further, if the white blank is expressed by one pixel, it is not enough to enable the white blank to be recognized. On the contrary, if the white blank is expressed by three pixels, deterioration of the pixel becomes remarkable. For these reasons, it is determined to express the white blank by two pixels. Furthermore, to increase decoding and recognizing rates, the 00 areas are arranged at both the sides of the FF area. In this case, however, if the two-pixel white blanks are at both the sides of the FF area, the white blanks are remarkable. Therefore, the 00 area at one side is made to have the one-pixel width.

Figure 26:
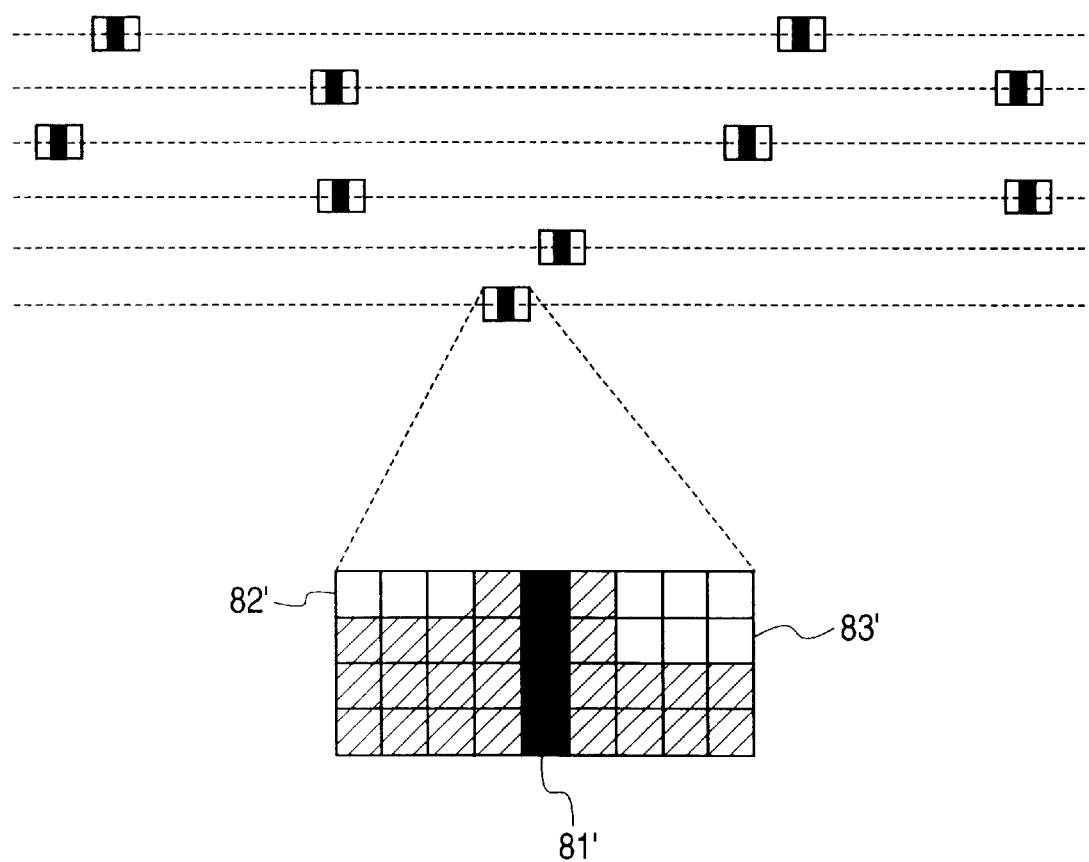
FIG. 26 is a view showing add-on dots.

FIG. 26 shows the add-on pattern of the present embodiment which is formed in consideration of the above matter. An FF area 81' has a size of 1×4 pixels, a 00 area 82' has a size of 3×1 pixels and a 00 area 83' has a size of 3×2 pixels, respectively. As to oblique-line areas, any modulation on the input image is not performed.

Figure 27A:
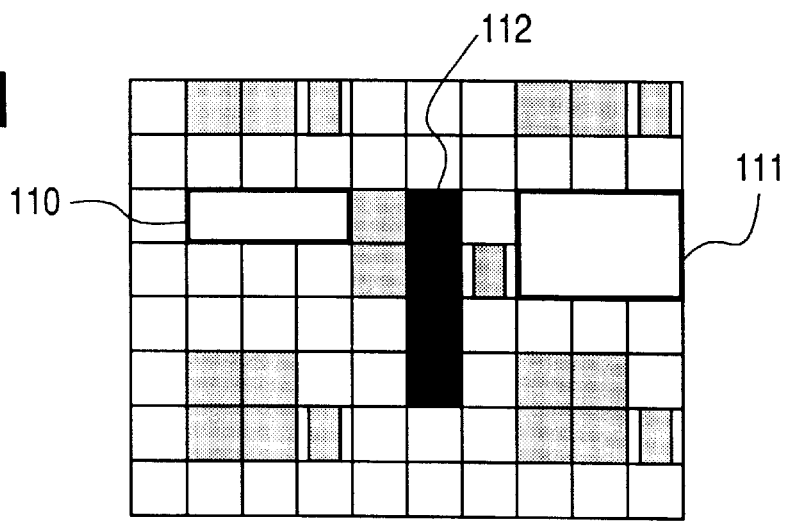
FIGS. 27A, 27B and 27C are views showing an example that the add-on dots were added to the halftone dot.
Figure 27B:
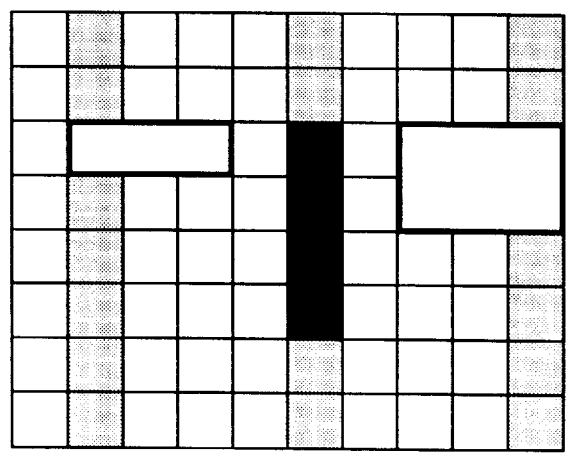
Figure 27C:
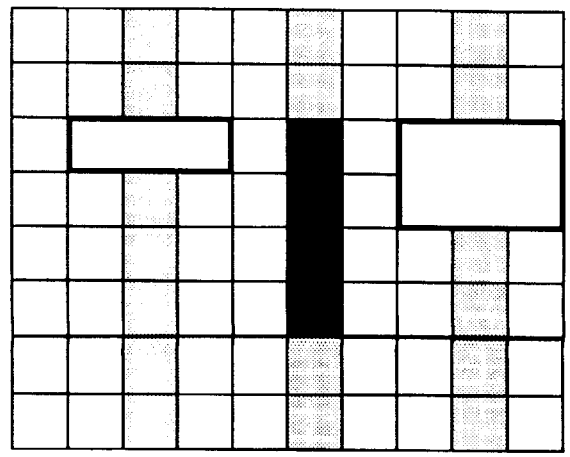

FIGS. 27A to 27C respectively show examples that the add-on dot is added to the respective halftone dots of FIGS. 22A to 22C in the positional relationship which is most difficult to be decoded. That is, each of FIGS. 27A to 27C shows the state that the positional relationship between the add-on dot and the halftone dot is worst.

In FIG. 27A, since 00 areas 110 and 111 at both the sides overlap the white background of the original input image, these areas can not be recognized or perceived. However, since an FF area 112 is projected from the halftone dot by two pixels, this area can be decoded and recognized.

Further, in FIG. 27B, since the FF area 112 overlaps the halftone dot, this area can not be recognized. However, the 00 areas 110 and 111 at both the sides can be recognized as cutouts.

Furthermore, like FIG. 27B, the 00 areas at both the sides in FIG. 27C can be recognized as the cutouts.

Furthermore, since the 00 areas 111 and 110 replace the longitudinal lines with the white blanks by the two- and one-pixel width respectively, the image can be formed without substantially deteriorating its image quality.

As described above, by using the add-on dot in the present embodiment explained in FIG. 26, even in the case where the plural halftone processes are selectively performed, the additional information can be easily decoded and recognized from the printed image, and further the image can be formed without substantially deteriorating its quality.

When the dot pattern which was inputted in such the manner as above and represents the additional information added to the original image is read by an image scanner or the like and then only the yellow plane is extracted, the additional information representing the machine number or the like of the record apparatus can be obtained. Therefore, the condition in which the image was formed can be known based on such the additional information.

As above, in the present embodiment, the laser beam printer has been explained by way of example. However, the present embodiment can be needless to say applied to other various-type printers such as an ink jet printer, an LED printer and the like.

Further, in the present embodiment, the add-on dot which can be applied to the three kinds of the halftone processes has been described. However, such the add-on dot can be of course applied to other typical halftone processes.

Therefore, although the halftone process is performed by using the controller 202 in the present embodiment, a case where the various kinds of the halftone processes are selectively performed by the host computer 201 is also included in the present invention. That is, even if any of the various kinds of the halftone processes to be performed by the host computer is actually executed, the add-on pattern of one shape can be added.

Further, even in a case where the plural controllers respectively performing the different halftone processes are connected to the engine 203 and used, if the add-on pattern of the present embodiment has been previously prepared in the engine 203, the additional information can be easily decoded and recognized from the printed image, and further the image can be formed without substantially deteriorating its image quality.

As described above, according to the present embodiment, even if the plural halftone processes are selectively performed, the additional information is always added by using the single add-on dot pattern, whereby operation costs of the apparatus can be reduced.

Further, in the case where the identical additional information is added, such the additional information is always added by using the add-on dot pattern of the same shape, whereby it can be prevented that, e.g., the erroneous information is obtained when decoding the printed image and obtaining the additional information, as compared with the case where the shape of the add-on pattern is changed by using the plural halftone processes.

As explained above, according to the present invention, it is possible to provide the single dot pattern addition system which is suitable for any of the plural halftone processes selectively executable. Therefore, since there is no need to change the dot pattern addition system according to each halftone process method, the additional information can be added with simple structure.

The present invention can be applied partially to a system constructed by plural equipments (e.g., a host computer, an interface equipment, a reader, a printer or the like) or can be also applied partially to an apparatus consisting of one equipment (e.g., a copy machine or a facsimile machine).

Further, the present invention is not limited only to the apparatus and method for realizing each embodiment as above. That is, the invention employed by a method wherein program codes of a software to realize the functions of each embodiment are supplied to a computer in an apparatus or a system connected to various devices so as to make the devices operative in order to realize the functions of each embodiment and the various devices are operated in accordance with the programs stored in the computer (CPU or MPU) of the system or apparatus is also included in the scope of the present invention.

In such the case, the program codes themselves of the software realize the functions of each embodiment and the program codes themselves and means for supplying the program codes to the computer, e.g., a storage medium in which the program codes have been stored, are included in the scope of the present invention.

As such a memory medium to store the program codes, e.g., a floppy disk, a hard disk, an optical disk, a magneto-optical disk, a CD-ROM, a magnetic tape, a non-volatile memory card, a ROM or the like can be used.

Also, even in not only a case where the functions of each embodiment are realized by executing the supplied program codes by the computer but also a case where the functions of each embodiment are realized in cooperation with the OS (operating system) by which the program codes operate in the computer or another application software or the like, such the program codes are of course included in the scope of the present invention.

Further, of course, the present invention also includes a case where the supplied program codes are stored in a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the above-described embodiment are realized by the processes.

The present invention has been described in connection with the above preferred embodiments. However, the present invention is not limited only to these embodiment, but various modifications are possible without departing from the scope of the appended claims.

What is claimed is:

1. An image process apparatus comprising:

generation means for generating an image signal;

image conversion means for performing image conversion on the image signal by selectively using one of plural image conversion methods;

generation mean for generating predetermined additional information;

selection means for selecting an addition method to add the predetermined additional information to the image signal, according to the image conversion method used when said image conversion means performs the image conversion on the image signal; and addition means for adding, in the addition method selected by said selection means, the predetermined additional information to the image signal in a state that the added information is difficult to be perceived by human eyes.

2. An apparatus according to claim 1, wherein the image signal is a multivalue image signal, and the image conversion by said image conversion means is to convert a gradation of the multivalue image signal.

3. An apparatus according to claim 1, wherein the plural image conversion methods include a method to perform a dither process.

4. An apparatus according to claim 1, wherein the plural image conversion methods include a method to perform a PWM (pulse wave modulation) process.

5. An apparatus according to claim 1, wherein said addition means adds the predetermined additional information as a dot pattern.

6. An apparatus according to claim 1, wherein the image signal is a color image signal, and said addition means adds the additional information not to all of color components included in the color image signal but to a part of the color components, whereby the additional information is added in the state that the added information is difficult to be perceived by the human eyes.

7. An apparatus according to claim 1, wherein the predetermined additional information is a machine number of said image process apparatus.

8. An apparatus according to claim 1, wherein a content of the additional information added by said addition means is identical irrespective of the image conversion method used when said image conversion means converts the image signal.

9. An image process method comprising:

a generation step of generating an image signal;

an image conversion step of performing image conversion on the image signal by selectively using one of plural image conversion methods;

a generation step of generating predetermined additional information;

a selection step of selecting an addition method to add the predetermined additional information to the image signal, according to the image conversion method used when said image conversion step performs the image conversion on the image signal; and an addition step of adding, in the addition method selected in said selection step, the predetermined additional information to the image signal in a state that the added information is difficult to be perceived by human eyes.

10. A storage medium which stores, in a computer readable state, an image process program comprising:

a generation step of generating an image signal;

an image conversion step of performing image conversion on the image signal by selectively using one of plural image conversion methods;

a generation step of generating predetermined additional information;

a selection step of selecting an addition method to add the predetermined additional information to the image signal, according to the image conversion method used when said image conversion step performs the image conversion on the image signal; and an addition step of adding, in the addition method selected in said selection step, the predetermined additional information to the image signal in a state that the added information is difficult to be perceived by human eyes.

11. An image process apparatus comprising:

halftone process means for generating an image signal, and performing a halftone process on the image signal by selectively using one of plural halftone process methods;

generation means for generating predetermined additional information; and addition means for adding the predetermined additional information to the image signal in a state that the added information is difficult to be perceived by human eyes, according to a spatial frequency of a halftone cell corresponding to the halftone process method selected by said halftone process means and a writing start position of the image signal.

12. An image process method comprising:

a halftone process step of generating an image signal, and performing a halftone process on the image signal by selectively using one of plural halftone process methods;

a generation step of generating predetermined additional information; and an addition step of adding the predetermined additional information to the image signal in a state that the added information is difficult to be perceived by human eyes, according to a spatial frequency of a halftone cell corresponding to the halftone process method selected in said halftone process step and a writing start position of the image signal.

13. A storage medium which stores, in a computer readable state, an image process program comprising:

a halftone process step of generating an image signal, and performing a halftone process on the image signal by selectively using one of plural halftone process methods;

a generation step of generating predetermined additional information; and an addition step of adding the predetermined additional information to the image signal in a state that the added information is difficult to be perceived by human eyes, according to a spatial frequency of a halftone cell corresponding to the halftone process method selected in said halftone process step and a writing start position of the image signal.

14. An image process apparatus comprising:

input means for inputting an image signal; and addition means for adding a pattern which is obtained by combining plural dots each composed of first and second areas of which longitudinal directions are different from each other such that the pattern represents additional information, to the image signal inputted by said input means in a state that the added pattern is difficult to be perceived by human eyes.

15. An apparatus according to claim 14, further comprising halftone process means for performing a halftone process on the image signal inputted by said input means.

16. An apparatus according to claim 15, wherein said halftone process means can selectively execute plural halftone process methods.

17. An apparatus according to claim 16, wherein the halftone process method is a dither process method.

18. An apparatus according to claim 16, wherein the halftone process method is a PWM (pulse width modulation) process method.

19. An apparatus according to claim 16, wherein the halftone process method includes a method to perform a PWM process after performing a dither process, and a method to perform the PWM process without performing the dither process.

20. An apparatus according to claim 14, wherein each of the first and second areas is composed of plural pixels.

21. An apparatus according to claim 14, wherein the first area is a print area obtained when an image represented by the image signal added with the pattern by said addition means is printed, and the second area is a non-print area obtained when the image represented by the image signal added with the pattern by said addition means is printed.

22. An apparatus according to claim 14, wherein each dot is composed of the first area and the plural second areas.

23. An apparatus according to claim 22, wherein the plural second areas in each dot have different shapes respectively.

24. An apparatus according to claim 22, wherein the plural second areas in each dot set a length in the longitudinal direction such that the length corresponds to the number of lines of the plural PWM processes.

25. An apparatus according to claim 14, wherein the additional information is information representing a machine number of said image process apparatus.

26. An apparatus according to claim 14, wherein the image signal inputted by said input means is a color image signal composed of plural colors, and the additional information is to add the pattern only to the color image signal of yellow.

27. An image process method comprising:

an input step of inputting an image signal; and an addition step of adding a pattern which is obtained by combining plural dots each composed of first and second areas of which longitudinal directions are different from each other such that the pattern represents additional information, to the image signal inputted in said input step in a state that the added pattern is difficult to be perceived by human eyes.

28. A storage medium which stores, in a computer readable state, a control program comprising:

an input step of inputting an image signal; and an addition step of adding a pattern which is obtained by combining plural dots each composed of first and second areas of which longitudinal directions are different from each other such that the pattern represents additional information, to the image signal inputted in said input step in a state that the added pattern is difficult to be perceived by human eyes.

* * * * *

UNITED STATES PATENT AND TRADEMARK OFFICE
CERTIFICATE OF CORRECTION

PATENT NO.    : 6,384,935 B1
DATED         : May 7, 2002
INVENTOR(S)   : Hiroyuki Yamazaki It is certified that error appears in the above-identified patent and that said Letters Patent is hereby corrected as shown below:

<u>Title page,</u>
Item [57], ABSTRACT,
Line 7, "comprises" should read -- comprising --;
Line 10, "An another" should read -- Another --;
Line 14, "comprises" should read -- comprising --;
Line 18, "A still" should read -- Still --; and
Line 22, "comprises" should read -- comprising --.

<u>Column 1,</u>
Line 26, "an" should read -- a --;
Line 53, "the" should read -- a --; and
Line 55, "the" should read -- an --.

<u>Column 2,</u>
Line 22, "An another" should read -- Another --; and
Line 44, "A still" should read -- Still --.

<u>Column 4,</u>
Line 6, "such" should be deleted.

<u>Column 5,</u>
Line 8, "the" should read -- a --;
Line 31, "an" should read -- a --; and
Line 42, "the" should read -- a --.

<u>Column 6,</u>
Line 37, "put such the" should read -- printing such a --; and
Line 65, "such the" should read -- such --.

<u>Column 7,</u>
Line 16, "such the" should read -- such a --; and
Line 60, "the" should read -- a --.

UNITED STATES PATENT AND TRADEMARK OFFICE
CERTIFICATE OF CORRECTION

PATENT NO.    : 6,384,935 B1
DATED         : May 7, 2002
INVENTOR(S)   : Hiroyuki Yamazaki It is certified that error appears in the above-identified patent and that said Letters Patent is hereby corrected as shown below:

<u>Column 8,</u>
Line 11, "to use" should read -- use of --; and
Line 21, "an" should be deleted.

<u>Column 9,</u>
Line 37, "the" (second occurrence) should be deleted.

<u>Column 11,</u>
Line 20, "process" should read -- processes --;
Line 29, "the" should read -- a --; and
Line 51, "such the" should read -- such an --.

<u>Column 12,</u>
Line 43, "as" should read -- a --; and
Line 44, "the" should be deleted.

<u>Column 13,</u>
Line 26, "the" should read -- a --; and
Line 63, "the" should read -- a --.

<u>Column 14,</u>
Line 39, "such the" should read -- such an --;
Line 47, "such the" should read -- such an --; and
Line 52, "such the" should read -- such an --.

<u>Column 15,</u>
Line 48, "the" (second occurrence) should read -- a --.

<u>Column 16,</u>
Line 36, "equipments" should read -- pieces of equipment --.

UNITED STATES PATENT AND TRADEMARK OFFICE
CERTIFICATE OF CORRECTION

PATENT NO. : 6,384,935 B1
DATED : May 7, 2002
INVENTOR(S) : Hiroyuki Yamazaki

It is certified that error appears in the above-identified patent and that said Letters Patent is hereby corrected as shown below:

Column 17,
Line 1, "the" (first occurrence) should be deleted; and
Line 13, "embodiment" should read -- embodiments --.

Signed and Sealed this

Tenth Day of December, 2002

JAMES E. ROGAN
*Director of the United States Patent and Trademark Office*